United States Patent [19]
Sugimoto et al.

[11] Patent Number: 5,619,110
[45] Date of Patent: Apr. 8, 1997

[54] SAFETY ENSURING APPARATUS

[75] Inventors: Noboru Sugimoto, Tokyo; Masatoshi Suzuki, Yokohama; Koichi Futsuhara; Masayoshi Sakai, both of Urawa; Ritsuo Mihira, Tokyo, all of Japan

[73] Assignees: KAO Corporation; The Nippon Signal Co., Ltd.; Yamatake & Co., Ltd., all of Tokyo, Japan

[21] Appl. No.: 379,476

[22] PCT Filed: Jun. 4, 1993

[86] PCT No.: PCT/JP93/00758

§ 371 Date: Mar. 27, 1995

§ 102(e) Date: Mar. 27, 1995

[87] PCT Pub. No.: WO94/29638

PCT Pub. Date: Dec. 22, 1994

[51] Int. Cl.$^6$ ........................................................ E05C 3/06
[52] U.S. Cl. .............................................. 318/450; 70/282
[58] Field of Search .................................. 318/362, 364, 318/374, 375, 434, 450, 470, 558; 70/271, 282; 292/201

[56] References Cited

U.S. PATENT DOCUMENTS

| | | |
|---|---|---|
| 3,171,062 | 2/1965 | Rowe . |
| 4,019,763 | 4/1977 | Webb, Sr. .................... 70/282 X |
| 4,105,903 | 8/1978 | Shaw et al. . |
| 4,132,009 | 1/1979 | Bochan ............................ 34/45 |
| 4,661,880 | 4/1987 | Futusuhara . |
| 5,027,114 | 6/1991 | Kawashima et al. . |

FOREIGN PATENT DOCUMENTS

| | | |
|---|---|---|
| 9192270 U | 7/1991 | Germany . |
| 44-15249 | 7/1969 | Japan . |
| 55-4320 | 1/1980 | Japan . |
| 55-23119 | 6/1980 | Japan . |
| 55-35590 | 9/1980 | Japan . |
| 58-4594 | 1/1983 | Japan . |
| 59-40952 | 11/1984 | Japan . |
| 60-21438 | 5/1985 | Japan . |
| 1-23006 | 4/1989 | Japan . |
| 4-327098 | 11/1992 | Japan . |

OTHER PUBLICATIONS

"Application Of Window Comparator To Majority Operation", Proc. of 19th International Symp. on Multiple–Valued Logic, IEEE Computer Society, May 1989.
"Realization Of Fail–Safe Train Wheel Sensor Using Electromagnetic Induction", IEEE Transaction on Instrumentation and Measurement, vol. 38, No. 2, Apr. 1989.
"A Construction Method For An Interlock System Using A Fail–Safe Logic Element Having Window Characteristics", Koichi Futusuhara et al., T. IEE Japan, vol. 109 C, No. 9, Sep. 1989.
"LSI Implementation And Comparator Used In Fail–Safe Multiple–Valued Logic Operation", IEICE trans. Electron., vol. E76–C, No. 3, Mar. 1993, pp. 419–427.

Primary Examiner—Brian Sircus
Attorney, Agent, or Firm—Lowe, Price, LeBlanc & Becker

[57] ABSTRACT

The present invention relates to a safety ensuring apparatus for ensuring the safety of an operator.

A mechanical moving part is surrounded by a safety enclosure with a door of the safety enclosure provided with a door lock device constructed such that the door lock device releases a door lock when a current is supplied from outside to excite a solenoid incorporated therein. The apparatus is constructed such that a lock is released when the mechanical moving part is stopped. Moreover, the construction incorporates a moving part monitoring sensor which monitors if the mechanical moving part is stopped. When mechanical moving part is stopped, the moving part monitoring sensor generates, without a negative operation, an output signal of logic value 1 corresponding to a high energy condition, and the solenoid of the door lock device is excited by this output signal.

As a result, the lock of the door lock device is released once the mechanical moving part has stopped. Moreover, at the time of a sensor fault, the solenoid is not excited so that the lock of the door lock device is not released. Hence operator safety can be reliably ensured.

12 Claims, 17 Drawing Sheets

SAFETY ENSURING APPARATUS

TECHNICAL FIELD

The present invention relates to a safety ensuring apparatus for ensuring the safety of operators working at factories and the like.

BACKGROUND ART

With equipment requiring for example, maintenance of mechanical moving parts, or coordinated (alternate) operation between an operator and a mechanical moving part, measures to ensure operator safety are extremely important.

In situations for example, where an operator approaches a danger region wherein it is possible to touch a mechanical moving part, conventional methods of ensuring safety when the mechanical moving part is in a movable condition, involve first shutting off the motor power supply in the case of motor driven mechanical moving parts, or shutting off the pressure supply in the case of pressure driven mechanical moving parts. The operator then verifies that the mechanical moving part has stopped, before approaching the mechanical moving part.

In practice however, there is the case wherein the operator approaches the mechanical moving part with the judgment that it will soon stop although it has not completely stopped. There is also the case wherein the operator mistakenly approaches while the mechanical moving part is moving. Furthermore, there is the case wherein the mechanical moving part which normally stops after a predetermined time interval, does not stop within the normal period due to a fault in the mechanical side (for example a fault in the braking).

It is therefore necessary to implement some type of safety measure. Conventional methods involve surrounding the mechanical moving part with a safety enclosure. There is also the case which adopt an arrangement for shutting off the drive power source to the mechanical moving part when the door to the safety enclosure is opened.

However, even though the drive power source to the mechanical moving part may for example be shut off by opening the door, since the mechanical moving part cannot stop instantaneously, there is the possibility of the operator approaching the mechanical moving part inside the safety enclosure before it has completely stopped.

Here an interlock system can be considered with a door lock incorporating a solenoid, provided in the door of the safety enclosure, so that the lock is released when the solenoid is excited. With this interlock system, the solenoid is excited when the mechanical moving part inside the safety enclosure stops, thereby releasing the lock only after the mechanical moving part has stopped.

Such an interlock system, necessitates a sensor which detects the stopping of the mechanical moving part, and stops the solenoid. An example, of such a sensor for detecting the stopping of the mechanical moving part and exciting the solenoid is shown in FIG. 1.

In FIG. 1, a rotation body 3 is provided by way of a speed reducing mechanism 2 on a motor 1 which is used to drive a mechanical moving part. A rotation disc 4 having a plurality of apertures 4a around a periphery thereof, is attached to the rotation body 3. A light emitting element 5 and a light receiving element 6 of a photo-interrupter are positioned opposite each other on either side of the rotation disc 4.

When the motor 1 is rotating, the light beam from the light emitting element 5 is received intermittently by the light receiving element 6 through the apertures 4a, depending on the rotation of the rotation disc 4. An alternating current signal as shown in FIG. 1 is therefore output from the light receiving element 6. This is amplified by an AC amplifier 7 and rectified by a rectifying circuit 8 to produce a direct current output signal. When the motor 1 is not rotating however, the light beam from the light emitting element 5 is either shut off by the rotation disc 4 so as not to reach the light receiving element 6, or continuously received by the light receiving element 6 by way of the apertures 4a. The output of the light receiving element 6 is therefore either a zero or a constant level direct current output. Hence a direct current output is not produced by the rectifying circuit 8.

Accordingly, when the motor 1 is rotating the output from an inverter 9 becomes zero (an output of logic value zero), while when the motor 1 is not rotating an output of a predetermined level (output of logic value 1) is generated from the inverter 9. This enables a construction wherein the solenoid of the door lock is excited by the output from the inverter 9, so that when the motor 1 is stopped, the solenoid of the door lock is excited and the lock released.

However, with the conventional sensor such as described above, for detecting the stopping of the mechanical moving part, when for example a fault occurs in the light emitting element 5, the light receiving element 6, the AC amplifier 7 or the rectifying circuit 8, such that an alternating current signal based on the light beam is not transmitted, then if the inverter 9 is operating normally, the output of the inverter remains at a logic value of 1 irrespective of operation of the motor 1, so that an output signal for release of the door lock is produced.

This is because, with such a conventional sensor, the stopping of the mechanical moving part is indicated by an output of a low energy condition, and this output signal is subjected to NOT operation (by the inverter 9) to, thereby, produce an output signal of logic value 1 corresponding to the high energy condition for solenoid excitation. With this sensor construction which includes the NOT operation circuit, then even with a fail safe construction wherein an output signal of logic value 1 is not produced at the time of a fault in the NOT operation circuit, if a disconnection fault occurs in the input signal supply line to the NOT operation circuit, then the erroneous generation of an output signal of logic value 1 will occur. Such a disconnection fault in the input signal line has the same effect as the occurrence of a fault in the AC amplifier 7, the rectifying circuit 8, or the light emitting/light receiving elements 5, 6 in FIG. 1.

Accordingly, an interlock system using a sensor which errs in this way to a logic value of 1, cannot be considered sufficient for guaranteeing the safety of the operator.

The present invention takes into consideration the above-mentioned situation with the object of providing a safety ensuring apparatus which can reliably ensure the safety of the operator, by utilizing a sensor which directly indicates the stopping of the mechanical moving part with an output signal of logic value 1 corresponding to a high energy condition. A further object of the present invention is to provide a safety ensuring apparatus which can reliably ensure the safety of the operator, by utilizing a fail safe on-delay circuit. Moreover, the safety ensuring apparatus of the present invention is able to provide an interlock system which meets the functional requirements for "Solenoid Locking Safety Switches" covered by British Standard BS5304, Para. 9.7.2.3.2.

DISCLOSURE OF THE INVENTION

With the present invention, a safety ensuring apparatus wherein a mechanical moving part is surrounded by a safety enclosure, and a door lock device is provided in a door of the safety enclosure, the door lock device being constructed such that a lock is released when a current is supplied from outside to excite a solenoid incorporated therein, is constructed such that the door lock device releases a door lock is released when the mechanical moving part is stopped, and is characterized in that the construction incorporates a moving part monitoring sensor which monitors if the mechanical moving part is stopped and generates an output signal of logic value 1 corresponding to a high energy condition when a stopped condition is detected, and the solenoid of the door lock device is excited by the output signal of logic value 1 from the moving part monitoring sensor.

With such a construction, when the mechanical moving part is being driven, then operator safety can be reliably ensured without erroneous release of the door lock device.

If the drive source for the mechanical moving part is a motor, the construction may involve verifying that the mechanical moving part is stopped by monitoring the supply current to the motor, or impedance changes in the motor excitor winding, to detect rotation or stopping of the motor.

If the drive source for the mechanical moving part is a pressure source, the construction may involve verifying that the mechanical moving part is stopped, by detecting the residual pressure in the pressure transmission system to the mechanical moving part.

If the construction is such that the output of the sensor is delayed by a predetermined time delay through an on-delay circuit, then release of the door lock device will take place under conditions wherein the mechanical moving part is definitely stopped. Hence the operator safety can be more reliably ensured.

The door lock device may be constructed by a door switch incorporating electrical contacts which come on when the door is closed, and go off when the door is opened so that drive power supply to the mechanical moving part is only possible when the door is closed.

Moreover, the construction may incorporate a detector portion for detecting that the power supply switch for on/off switching of the drive power to the mechanical moving part has been switched off, and an on-delay circuit for generating an output signal of logic value 1 corresponding to a high energy condition after a predetermined time delay from the time when the detector portion detects that the power supply switch is off and an input signal is input, and also for generating an output signal of logic value 0 corresponding to a low energy condition at the time of a fault, and the solenoid of the door lock device may be excited by the output signal of logic value 1 from the on-delay circuit.

BEST MODE FOR CARRYING OUT THE INVENTION

As follows is a description of an embodiment of a safety ensuring apparatus according to the present invention with reference to the drawings.

Figure 1:
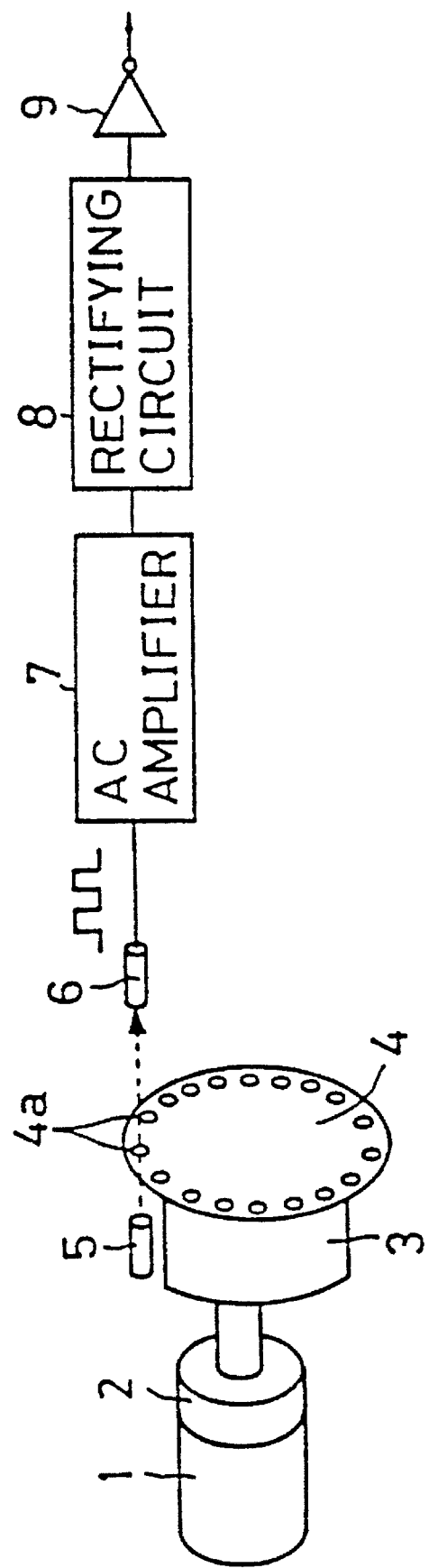
FIG. 1 is a schematic diagram of a conventional motor rotation stopped detection sensor.
Figure 2:
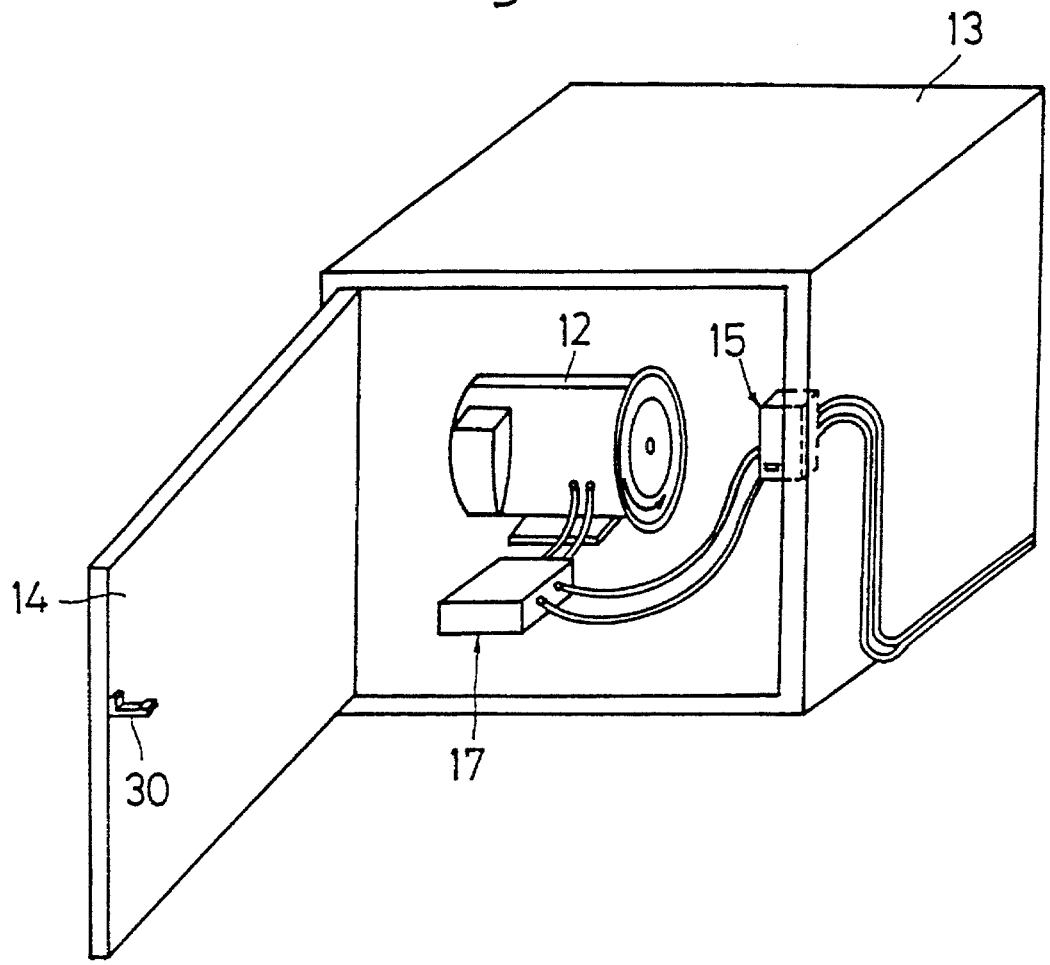
FIG. 2 is a schematic diagram showing an embodiment of the present invention wherein the safety ensuring apparatus is applied to a motor driven mechanism.
Figure 3:
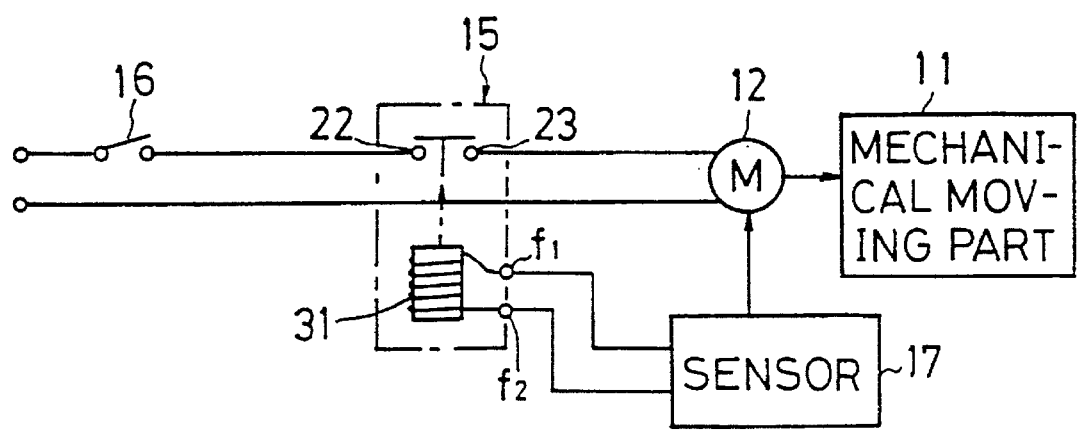
FIG. 3 is a circuit diagram for the embodiment of FIG. 2.

FIG. 2 and FIG. 3 show an embodiment of the present invention wherein the safety ensuring apparatus is applied to the mechanical moving part of a motor drive.

In FIG. 2 and FIG. 3, a mechanical moving part 11 and a motor 12 (the drive source for driving the mechanical moving part 11) are enclosed within a safety enclosure 13 having a door 14. A door switch 15 (door lock means) which locks the door 14 when the door 14 is closed, is provided in the opening of the safety enclosure 13. The door switch 15 has contacts 22, 23, as described later, which close when the door 14 is closed. The contacts 22, 23, as shown in FIG. 3, are disposed in a power supply line to the motor 12 in series with a power switch 16, so that power is supplied to the motor 12 via the door switch 15. This arrangement is to ensure that power is not supplied to the motor 12 when the door 14 is opened.

A moving part monitoring sensor 17 is provided inside the safety enclosure 13, for monitoring whether or not the mechanical moving part 11 is stopped based on the rotation or stopping of the motor 12, and for generating an output signal of logic value 1 corresponding to a high energy condition when a stopped condition is detected. A solenoid 31 of the door switch 15 is excited by the output signal of logic value 1 from the moving part monitoring sensor 17.

A concrete example of the door switch 15 will now be described with reference to FIG. 4 and FIG. 5.

The construction of the door switch 15 is such that when the door 14 is closed so that an attachment 30 fitted to the door 14 is inserted, the contacts 22, 23 come on, while when the door 14 is opened so that the attachment 30 is withdrawn, the contacts 22, 23 go off. Moreover, in the door locked condition, when a current flows to excite the solenoid 31, the lock is released. The concrete example shown in FIGS. 4 and 5, corresponds for example to the Atlas (trade name) lock of the British E. J. A. Engineering Co. Limited.

Figure 4:
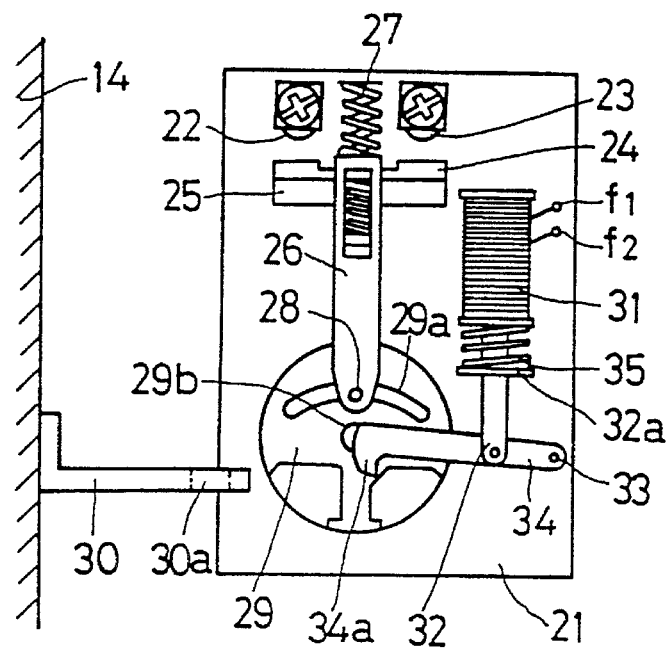
FIG. 4 is a schematic diagram showing a lock released condition for a door switch example.
Figure 5:
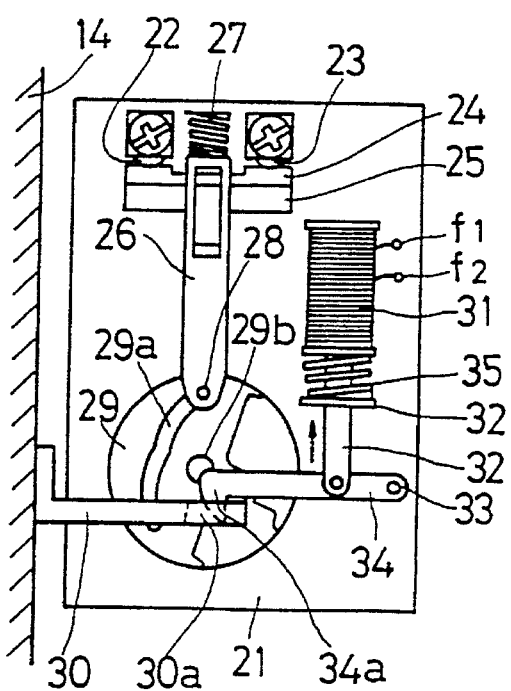
FIG. 5 is a schematic diagram showing a locked condition for the door switch example of FIG. 4.

In FIGS. 4 and 5, the contacts 22, 23 are fixed to an upper portion of a base 21 which is fixed to the safety enclosure 13, and are located so that electrical contact is possible by way of an electrical conductor 24. The electrical conductor 24 is fixed through an insulator 25, to an arm 26. The arm 26 is normally resiliently pressed in a downward direction by a spring 27 provided at an upper end portion thereof. A pin 28 at a lower end portion, is engaged in a groove 29a of an escapement crank 29 which is mounted so as to be freely rotatable on the base 21, so that the arm 26 moves upwards and downwards with rotation of the escapement crank 29. The escapement crank 29 is contacted by the tip of the attachment 30 fitted to the door 14 when the attachment 30 is inserted with the closing of the door 14, and is thus rotated about a central axis 29b in a counter clockwise direction in FIG. 4.

The solenoid 31 which is fixed to the base 21, has coil leads f1, f2 connected to the output side of the moving part monitoring sensor 17, while the iron core thereof is fitted with a rod 32 formed with a brim portion 32a. A tip end portion of the rod 32 is rotatably connected to an intermediate portion of a lever 34 which is pivotally supported on a shaft 33 so as to be swingable up and down thereabout, and is continuously and resiliently pressed in a downward direction by a spring 35 which acts on the brim portion 32a. A tip end portion of the lever 34 is formed with a hook 34a for engagement with an aperture 30a formed in a tip portion of the attachment 30.

The operation of the door switch 15 will now be described.

The condition of FIG. 4 is for when the door 14 is open and the contacts 22, 23 are off. On closing the door 14 from this condition, the attachment 30 is inserted so that the tip thereof presses the escapement crank 29. As a result, the escapement crank 29 is rotated about the central axis 29b in a counter clockwise direction in FIG. 4, and with this rotation, the pin 28 of the arm 26 slides inside the groove 29a of the escapement crank 29 so that the arm 26 moves in an upward direction against the resilient force of the spring 27. The electrical conductor 24 is thus brought into contact with the contacts 22, 23 so that the contacts come on. Moreover, the tip of the attachment 30 also contacts against the hook portion 34a, pivoting the lever 34 about the pivotal support shaft 33 in an upward direction against the resilient force of the spring 35. The hook portion 34a then engages with the aperture 30a in the attachment 30 under the resilient force of the spring 35 so that the door 14 becomes locked as shown in FIG. 5. In this locked condition, the lock cannot be released as long as the solenoid 31 is not excited.

With the locked condition of FIG. 5, when the solenoid 31 is excited by power supply thereto through leads f1, f2, the rod 32 is moved by the iron core in an upward direction as shown by the arrow in FIG. 5. As a result, the lever 34 pivots about the shaft 33 in an upward direction, so that the hook portion 34a is withdrawn from the aperture 30a in the attachment 30 thus releasing the lock. When the door 14 is opened in this condition, the attachment 30 is withdrawn, and a protruding portion on the tip of the attachment 30 engages with the escapement crank 29 so that the escapement crank 29 is turned in a clockwise direction as shown in FIG. 5. As a result, the arm 26 is moved downwards, so that the electrical conductor 24 is lowered and separated from the contacts 22, 23 to give the off condition of FIG. 4.

Accordingly, with the construction of the safety ensuring apparatus of the embodiment of FIG. 2, and FIG. 3, when the door 14 is closed, the contacts 22, 23 of the door switch 15 come on, so that power can be supplied to the motor 12. Then when the power switch 16 is switched on, power is supplied to the motor 12 so that the mechanical moving part 11 can be driven. After switching off the power switch 16, the motor 12 stops rotating, and when the stopping of the motor 12 is detected by the moving part monitoring sensor 17, an exciting current is supplied from the moving part monitoring sensor 17 to the solenoid 31 of the door switch 15, so that the lock of the door switch 15 is released.

Therefore, with this safety ensuring apparatus, when the door 14 is open, power cannot be supplied to the motor 12 so that the mechanical moving part 11 is not driven. Moreover, the construction is such that the stopping of the motor 12 (drive source for the mechanical moving part 11) is first verified before the lock of the door switch 15 is released so that the door 14 can be opened.

Here the important point is that when there is a fault in the moving part monitoring sensor 17, there must be absolutely no current flow to the solenoid 31 of the door switch 15. The erroneous occurrence of a solenoid drive current due to a fault in the moving part monitoring sensor 17, in spite of the mechanical moving part 11 not being stopped, is not permitted. That is to say, the sensor must have fail-safe characteristics. To provide such a sensor, it is necessary to have a construction such that when the mechanical moving part 11 is stopped, a high energy condition output signal is generated in the moving part monitoring sensor 17, and this signal is used to drive the solenoid, either directly or for example, after amplification of the signal.

A construction may also be considered wherein power is supplied directly to the motor 12 from the power switch 16, and not via the door switch 15. In this case also, the door switch 15 is released so that the door 14 can be opened, only when the motor 12 is stopped. However this arrangement is undesirable since there is the danger of the mechanical moving part starting up when the power switch 16 is switched on with the door 14 in the open condition.

A concrete example of a sensor applicable to the safety ensuring apparatus of the present embodiment, that is to say, a concrete example of a fail-safe sensor which directly generates an output of a high energy condition (output of logic value 1) when stopping of the motor is detected, will now be illustrated.

Figure 6:
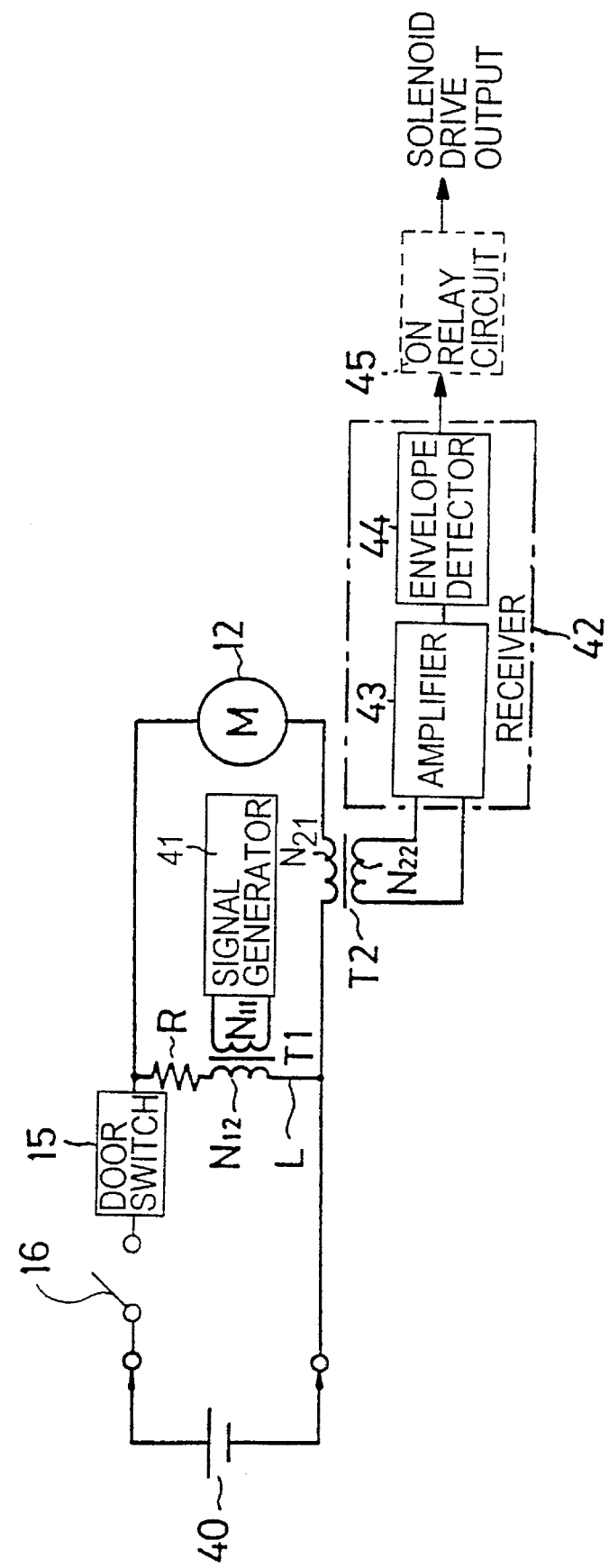
FIG. 6 is a schematic diagram of a concrete example of a moving part monitoring sensor in the form of a rotation stopped detection sensor which detects stopping of a motor based on the motor supply current.

FIG. 6 shows an example of a rotation stopped detection sensor which detects whether or not a motor is stopped, based on the presence or absence of a current flow to the motor.

In FIG. 6, a motor power supply circuit, with a motor drive power source 40 connected to a motor 12 via a power switch 16 and a door switch 15, is provided with a current line L in parallel with the motor 12, with a resistor R inserted therein. A first transformer T1 is inserted in series with the resistor R so that its secondary side winding N12 is constituted by a portion of the current line L. A primary side winding N11 of the first transformer T1 is connected to a signal generator 41 which constitutes a transmitting device for generating a high frequency signal. The high frequency signal from the signal generator 41 is transmitted to the current line L by way of the first transformer T1. Moreover, a second transformer T2 is inserted in the current line which is part other than the current line L of the closed circuit including the motor 12 which is created by the current line L when the power switch 16 is switched off, such that its primary side winding N21 is constituted by a portion of this current line. A secondary side winding N22 of the second transformer T2 is connected to an alternating current amplifier 43 of a receiver 42 which constitutes a receiving device, so that the high frequency signal transmitted to the current line L, is transmitted by way of the second transformer T2 to the receiver 42. Moreover the cores of both the first transformer T1 and the second transformer T2 comprise saturable magnetic body cores.

The receiver 42 comprises the alternating current amplifier 43, and an envelope detector 44 for detecting the envelope of the alternating current amplified signal from the alternating current amplifier 43. The alternating current amplifier 43 has a fail-safe AC amplifier construction such that when there is a fault, the output level is fixed. The alternating current amplified output from the alternating current amplifier 43 is envelope detected and rectified, and the rectified output used directly to excite the solenoid 31 of the door switch 5.

The operation will now be described.

At first when the motor 12 is rotating, and the door 14 is locked due to movement of the mechanical moving part 11, a current is supplied from the motor drive power source 40 to the motor 12, via the power switch 16 and the door switch 15. As well as this, a current flows in the resistor R, the secondary side winding N12 of the first transformer T1, and the primary side winding N21 of the second transformer T2. As a result, the saturable magnetic body cores of the first and second transformers T1, T2 become saturated, so that the first and second transformers T1, T2 attain a saturated condition, and the high frequency signal transmitted from the signal generator 41 through the winding N11 of the first transformer T1 to the winding N22 drops considerably, causing a significant drop in the output signal of the envelope detector 44, so that the solenoid 31 cannot be excited. Accordingly, the lock of the door 14 is not released while the motor 12 is rotating.

Consideration is now made of the situation immediately after the power switch 16 is switched off. Since the motor 12 continues to rotate under inertia, it becomes a generator so that a current continues to flow through the current line of the closed circuit formed by the resistor R, the winding N12, the winding N21, and the motor 12. Due to this current, the first and second transformers T1, T2 remain in the saturated condition, the same as when the power switch 16 is on, so that the solenoid 31 cannot be excited due to the low level of the output signal of the envelope detector 44. After the period of current flow due to inertial rotation of the motor 12, once the inertial rotation of the motor 12 has practically stopped, the current flow ceases so that the saturated condition of the first and second transformers T1, T2 is lost. The high frequency signal from the signal generator 41 is thus transmitted from the winding N11 to the winding N22 with practically no reduction through the first and second transformers T1, T2. The output signal of the envelope detector 44 thus becomes a high level with an output signal of logic value 1 corresponding to a high energy condition, so that the solenoid 31 is excited. Accordingly, in the condition wherein rotation of the motor 12 including rotation under inertia, has practically stopped, the lock of the door switch 15 is released so that the door 14 can be opened.

With this rotation stopped detection sensor, when a disconnection fault occurs in the resistor R, the windings N12, N21, or the excitor winding of the motor, then the output signal for the winding N22 goes to zero. Needless to say if a disconnection fault occurs in the winding N11 or the winding N22 the output signal also goes to zero. Methods having a fail-safe construction involving use of the alternating current amplifier 43 with the output of the alternating current amplifier rectified by an envelope detector 44 so that in the event of a circuit fault the output signal goes to zero, are disclosed for example in U.S. Pat. No. 5,027,114. U.S. Pat. No. 3,171,062, Japartese Examined Patent Publication No. 55-4320, and Japartese Examined Patent Publication No. 60-21438.

The output signal from the envelope detector 44 is directly made the excitor signal for the solenoid 31. However, if the construction is such that the output from the envelope detector 44 is output via an on-delay circuit 45 as shown by the dotted line in FIG. 6, so that there is a predetermined delay from generation of the motor 12 stopped detection output by the rotation stopped detection sensor until the solenoid 31 is excited, then operator safety can be more reliably ensured. Such an on-delay circuit, is made fail-safe as described later, so as to give an output of logic value 0 at the time of a fault.

Moreover a level tester as described later, with two input terminals of a fail-safe two input window comparator made common may be provided, so that the output signal of the envelope detector is level tested, and the resultant output signal used to drive the solenoid 31. Moreover, if for example a Schmitt circuit is used in the level tester for level testing the output signal of the alternating current amplifier 43, then the envelope detector 44 becomes unnecessary. In this case, the output signal of the Schmitt circuit becomes a logic value of 1 when the alternating current output signal from the alternating current amplifier 43 is generated, and a logic value of 0 when this is not generated.

Furthermore, when the motor drive power source 40 is an alternating current, then even during drive of the motor, the situation wherein the current momentarily becomes zero occurs periodically, so that the output signal from the signal generator 41 is momentarily generated in the winding N22 of the second transformer T2. However in this case, the provision of an on-delay circuit ensures that the solenoid 31 does not respond to the momentarily produced output signal from the envelope detector 44.

Figure 7:
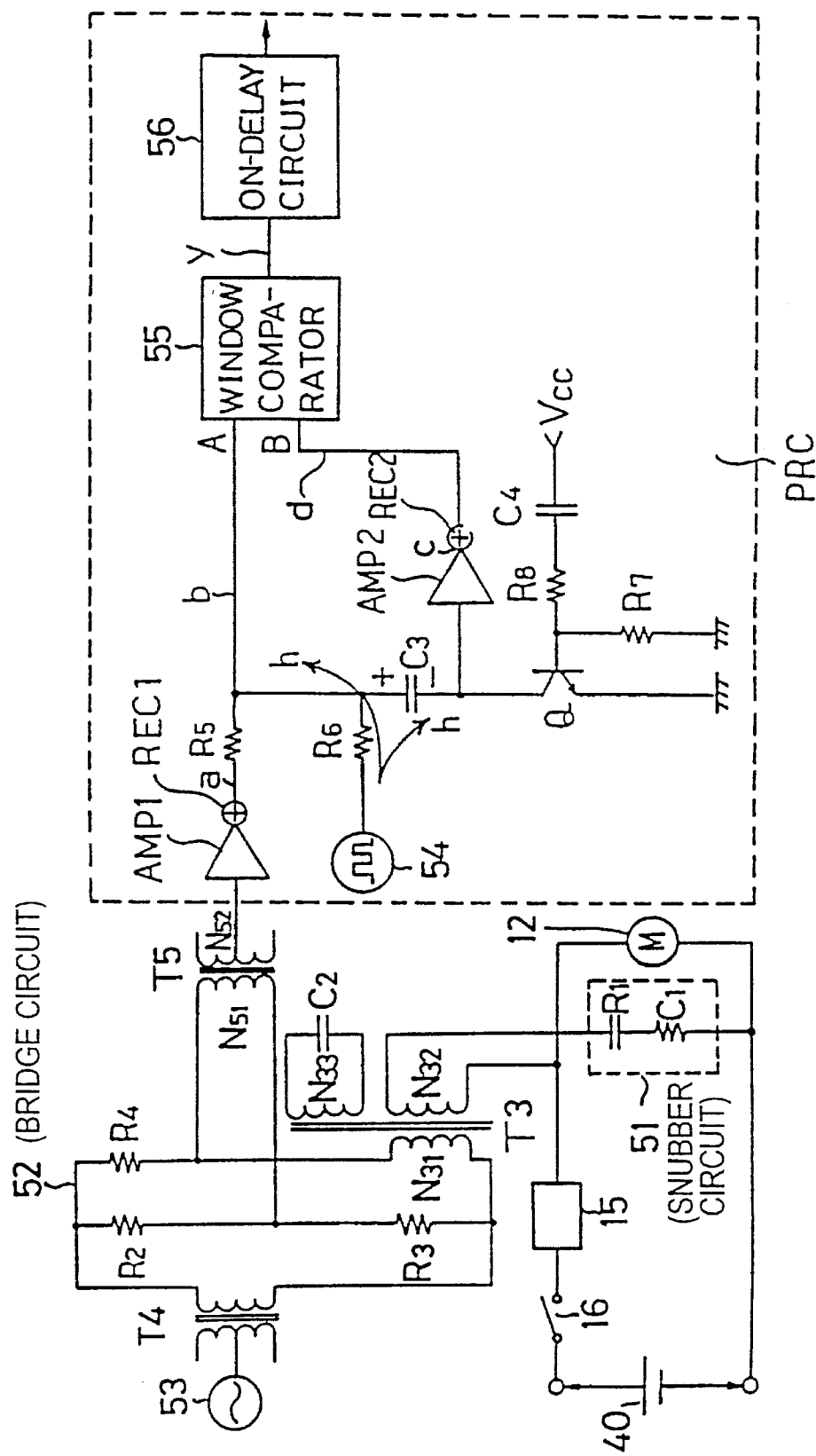
FIG. 7 is a schematic diagram of another concrete example of a moving part monitoring sensor in the form of a rotation stopped detection sensor which detects stopping of a motor based on a change in impedance in the motor excitor windings.

An example is now given with reference to FIG. 7, of a rotation stopped detection sensor which detects whether or not a motor is stopped, based on a change in impedance in the motor excitor windings.

In FIG. 7, a snubber circuit 51 (spark killer circuit)inserted in parallel with the motor 12, for buffering the electrical noise of the motor 12, comprises a resistor R1 and capacitor C1 connected in series. A secondary winding N32 of a transformer T3 (third transformer) is inserted in series with the snubber circuit 51. A bridge circuit 52 comprises a primary winding N31 of the transformer T3 inserted into one side and resistors R2, R3, R4 respectively inserted into the other three sides. The bridge circuit 52 is supplied, by way of a transformer T4, with an alternating current signal from an alternating current signal generator 53. The frequency of the alternating current signal is made sufficiently higher than the frequency of the motor drive power source for the case where the motor drive power source is an alternating current source. Here the snubber circuit 51 has a high impedance with respect to the motor drive power source frequency, and a low impedance with respect to the bridge circuit 52 excitation frequency (the signal frequency of the alternating current signal generator 53). Consequently, the series circuit of the snubber circuit 51 and the secondary winding N32 of the transformer T3 does not cause a high load on the motor drive power source 40. Moreover, when the motor 12 is seen from the secondary winding N32 as an electrical circuit, then when the power switch 16 is OFF, the impedance of the motor 12 can be monitored from the secondary winding N32 with little interference from the snubber circuit 51. A capacitor C2 is connected in parallel with a tertiary winding N33 of the transformer T3 to make up a resonance circuit which off-sets the reactance component on the secondary winding N32 side, so that the impedance seen from the primary winding N31 can be considered as a resistance component. A transformer T5 transmits the imbalance output signal of the bridge circuit 52 via its primary winding N51 to its secondary winding N52. The above arrangement constitutes the sensor section.

The imbalance output from the bridge circuit 52 which is transmitted to the secondary winding N52, that is the output signal from the sensor section, is input to a signal judgment section PRC which generates an output of logic value 1 for a motor rotation stopped condition based on the output signal from the sensor section.

The construction of the signal judgment section PRC will now be described.

In the circuit, an amplifier AMP 1 is for amplifying the input signal from the sensor section. A first rectifying circuit REC 1 is for detecting the envelope of the amplified input signal. A high frequency signal generator 54 which constitutes the high frequency signal generating device, generates a high frequency signal which is superimposed via resistor R6 onto the output signal from the first rectifying circuit REC 1 which has passed through resistor R5. A second amplifier AMP 2 which constitutes the amplifying device, is for amplifying the output signal of the rectifying circuit REC 1 which has been superimposed with the high frequency signal, and is constructed so as to be saturated at the output level of the rectifying circuit REC 1 for a motor rotation condition. A capacitor C3 is for transmitting the output signal of the first rectifying circuit REC 1, which has been superimposed with the high frequency signal, to the second amplifier AMP 2. A second rectifying circuit REC 2 is for rectifying the output signal from the second amplifier AMP 2 to detect the envelope thereof. A fail-safe two input window comparator 55 has a fail-safe construction (to be described later) so as not to generate an output of logic value 1 at the time of a fault. The output signal of the first rectifying circuit REC 1 which has been superimposed with the high frequency signal, is input to a first input terminal A thereof, while the rectified signal which has been amplified by the second amplifier AMP 2 and rectified by the second rectifying circuit REC 2 is input to a second input terminal B thereof. Only when the levels of both signals are together within predetermined threshold value ranges determined by an upper limit value and a lower limit value pre-set for each input terminal, is a motor stopped condition judged and an output of logic value 1 generated. In other words, the two input terminals A and B of the window comparator 55, each have respective upper limit and lower limit threshold values. When the input signals to the two input terminals A and B are both within the respective upper limit and lower limit threshold value ranges (windows) of the two input terminals A and B, the window comparator 55 generates an output signal (of logic value 1).

A fail-safe on-delay circuit 56 has a fail-safe construction as described later which ensures that a set delay time is not shortened at the time of a fault. It has the function of ensuring that a solenoid exciting output of logic value 1 is not generated from the signal judgement section PRC until the motor has completely stopped. A transistor Q has a collector connected to an intermediate point between the capacitor C3 and the second amplifier AMP 2, an emitter connected to earth, and a resistor R7 connected between a base and the emitter. Moreover, a power source voltage Vcc for the signal judgement section PRC is applied to the base by way of a capacitor C4 and a resistor R8. As a result, the transistor Q conducts instantaneously when power is applied through a differential circuit comprising the capacitor C4 and the resistors R7, R8, so that a charge for driving the capacitor C3 as a coupling capacitor is stored in a short time in the capacitor C3 thus increasing the operational start-up response of the signal judgement section PRC. When permissible for the signal judgement section PRC to have a slight start-up delay, and the electrostatic capacity of the capacitor C3 is not very large, then the start-up circuit using the transistor Q may be omitted.

The operation of the rotation stopped detection sensor will now be described.

When the power source to the signal judgement section PRC is switched ON, the transistor Q instantaneously conducts due to the start-up signal, so that a charge for driving the capacitor C3 as a coupling capacitor is stored in a short time in the capacitor C3 as indicated by the +, − in FIG. 7, giving a condition whereby rotation or non-rotation of the motor can be detected. Moreover, when an alternating current signal is supplied from the alternating current signal generator 53 to the bridge circuit 52, the resultant imbalance output of the bridge circuit 52 is input by way of the transformer T5 to the signal judgement section PRC as a sensor section output signal. This sensor section output signal is amplified by the amplifier AMP 1 and the envelope is detected by the rectifying circuit REC 1. Moreover, a signal b comprising a rectified signal a with the high frequency signal h from the high frequency signal generator 54 superimposed thereon is input to the first input terminal A of the window comparator 55, and is also input to the second amplifier AMP 2 by way of the capacitor C3. However, by this time the transistor Q is already in the OFF condition (non-conducting). With regards to the high frequency signal h of the high frequency signal generator 54, the rectifying circuit REC 1 contains a smoothing capacitor, and since this smoothing capacitor has a low impedance with respect to the high frequency signal h, almost all the high frequency signal h is divided by the resistor R6 and the resistor R5. The output from the rectifying circuit REC 1 superimposed with the high frequency signal h and input to the second amplifier AMP 2, is amplified by the second amplifier AMP 2 and the envelope detected by the rectifying circuit REC 2, and then input as a signal d to the second input terminal B of the window comparator 55.

Initially the condition with the power switch 16 OFF, and the motor 12 not rotating will be considered. Since the impedance of the snubber circuit 51 is sufficiently small, the impedance of the motor side seen from the secondary winding N32 of the transformer T3 is only that of the excitor winding of the motor 12 (including the influence from the rotor). In this condition, the imbalance output signal from the bridge circuit 53 of the sensor section, that is to say the output signal of the sensor section, differs depending on the stop position of the rotor of the motor 12. That is to say, the output for when the rotor is stopped at a location wherein the impedance of the motor excitor windings seen from the winding N32 becomes a minimum value, differs to that for when the rotor is stopped at a location wherein the impedance of the motor excitor windings seen from the winding N32 becomes a maximum value. The capacitor C2 is set so as to be given an approximate resonant condition matching the motor 12 stopped condition.

On the other hand, with the power switch 16 in the ON condition, then as well as the impedance of the excitor windings of the motor, the impedance of the motor 12 drive side is also connected in parallel to the motor 12. In this case, the impedance of the motor side seen from the winding N32 shows a considerable drop, so that the level of the output signal of the sensor section rises.

Accordingly the output conditions for the imbalance output signal of the bridge circuit which accomparty the on/off switching of the power switch 16 are at predetermined levels when the motor is stopped with the power switch 16 OFF, at a changing level when the motor rotates under inertia, due to the impedance change with rotation of the rotor, or at a level which accomparties the level change due to rotor rotation, when a considerable imbalance condition occurs when the power switch 16 is switched ON.

Accordingly, the threshold value ThAH of the upper limit and the threshold value ThAL of the lower limit of the first input terminal A of the window comparator 55 are set so that, when the power switch 16 is OFF, the output signal level of the rectifying circuit REC 1 is within the range of the window (between threshold values ThAH and ThAL) irrespective of the rotor stop position so that the conditions of the window comparator 55 for generating an output signal (y=1) are always satisfied (these are the oscillating conditions for equation (1) to be described later, and are referred to as the first output generating conditions), moreover, when the power switch 16 is ON, the output signal level of the rectifying circuit REC 1 is normally outside the abovementioned window.

Figure 8:
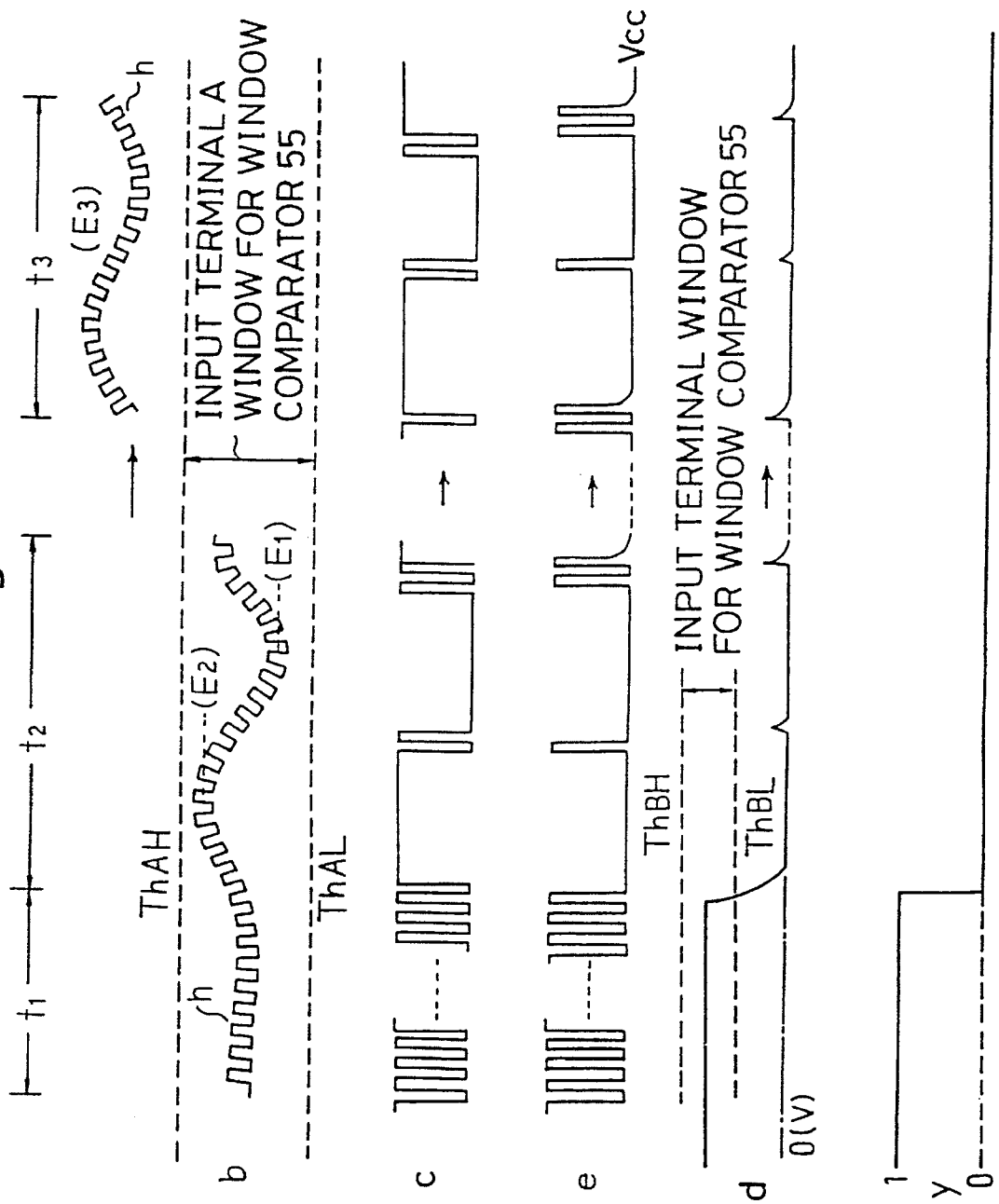
FIG. 8 is a time chart for explaining an operation of the rotation stopped detection sensor of FIG. 7.

FIG. 8 is a time chart showing the circuit of FIG. 7, in particular the operation of the signal judgement section PRC. In FIG. 8, symbols b, c, d, h, y, denote the signals for the corresponding respective locations in FIG. 7, while symbols t1, t2, t3 respectively indicate the conditions; for when the rotor of the motor is stopped, for when the rotor is rotating under inertia with the power switch 16 OFF, and for when the power switch 16 is ON.

When the output signal level of the rectifying circuit REC 1 is constant (when there are no fluctuations due to motor rotation), then as shown in FIG. 8, the output signal d from the rectifying circuit REC 2 is at a level inside the window between the upper limit threshold value ThBH and the lower limit threshold value ThBL of the second input terminal B of the window comparator 55. That is to say within a range satisfying the conditions of the window comparator 55 for generating an output signal (y=1) (these are the oscillating conditions for equation (2) to be described later, and are referred to as the second output generating conditions). The high frequency input signal h of the second amplifier AMP 2, which is at a level within the window of the second input terminal B as a result of amplification by the second amplifier AMP 2 and rectification by the rectifier REC 2, is at a small level. Moreover, the high frequency input signal h is small even when seen from the first input terminal A of the window comparator 55, and is sufficiently within the upper and lower threshold value ranges of the first input terminal A. Accordingly, when the level of the signal b which comprises the output signal a of the rectifying circuit REC 1 superimposed with the high frequency signal h of the high frequency signal generator 54, is within the window of the first input terminal A of the window comparator 55 and is constant (that is to say the power switch 16 is OFF and the motor is not rotating under inertia), then as shown for the interval $t_1$ at the top of the time chart of FIG. 8, the output signal (y=1) generating conditions of the first input terminal A of the window comparator 55 are satisfied. As well as this, the output signal d of the rectifying circuit REC 2 for the output signal c of the second amplifier AMP 2 which amplifies the high frequency input signal h (there are no signal fluctuations accompartying rotation of the rotor in the output signal of the rectifying circuit REC 1) also satisfies the output signal (y=1) generating conditions of the second input terminal B of the window comparator 55. Consequently, the window comparator 55 generates an output signal (y=1) of logic value 1. When this output signal (y=1) is input to the on-delay circuit 56 and this signal continues for more than a predetermined delay time set in the on-delay circuit 56, the output signal of the on-delay circuit 56 becomes a logic value 1. The solenoid 31 of the door switch 15 is excited by this output signal, so that the lock of the door switch 15 can be released.

When the power switch 16 is OFF, and the rotor is rotating under inertia, the level of the output signal a of the rectifying circuit REC 1 is not constant but fluctuates between the maximum and minimum values for the change in the imbalance output signal accompartying rotation, that is between E2 and E1 of b of FIG. 8. The signal b for input to the first input terminal A of the window comparator 55 also fluctuates as shown for the interval t2 at the top of the time chart of FIG. 8. However, the fluctuations are such that the beforementioned first output generating conditions for the level inside the window of the first input terminal A of the window comparator 55 are satisfied. Since the second amplifier AMP 2 amplifies and saturates the fluctuations E1–E2, the high frequency input signal h is masked in the saturation period and is intermittently generated in the linear shape region of the second amplifier AMP 2, so that the output signal c of the amplifier AMP 2 appears as shown in FIG. 8. This intermittently appearing high frequency signal which originally corresponds to the frequency of high frequency signal h, as the output signal d of the rectifying circuit REC 2, determining the time constant, as shown in the time chart of FIG. 8, does not attain the lower limit threshold value ThBL of the second input terminal B of the window comparator 55. As a result, the beforementioned second output generating conditions of the second input terminal B of the window comparator 55 are not satisfied, and the output signal y becomes a logic value of zero. Accordingly, when the motor M rotating under inertia with the power switch 16 OFF, the output signal of the window comparator 55 has an output condition of logic value zero. In FIG. 8, e indicates a waveform inside the rectifying circuit REC 2 to be discussed later.

When the power switch 16 is ON so that the motor M rotates, the level of output signal a from the rectifying circuit REC 1 becomes level E3, and the level of the signal b for input to the first input terminal A of the window comparator 55, as shown for interval $t_3$ at the top of the time chart of FIG. 8 becomes outside the window of the first input terminal A of the window comparator 55. Consequently the first output generating conditions are not satisfied. If at this time, the output of the amplifier AMP 1 is not saturated, then pulsations accompartying the motor rotation will exist in the signal for input to the second amplifier AMP 2. Hence the second output generating conditions for the second input terminal B of the window comparator 55 will not be satisfied, in the same way as for when the motor is rotating under inertia. Consequently, even in a worst case scenario where, within the interval $t_3$ the minimum value of the pulsation wave is lower than the upper limit threshold value ThAH of the window comparator 55 so that the first output generating conditions of the first input terminal A of the window comparator 55 are satisfied, since the second output generating conditions of the second input terminal B are not satisfied, the window comparator 55 cannot generate an output signal of y=1. When the amplifier AMP 1 saturates so that the signal b has a high level, the abovementioned pulse wave does not arise in signal b. For this reason, when the high frequency signal h is rectified by the rectifying circuit REC 2 the output signal d is at a level inside the window of the second input terminal B of the window comparator 55. However, in this case, since the first output generating conditions on the first input terminal A side are not satisfied, the window comparator 55 still cannot generate an output signal of y=1.

When during rotation of the rotor of the motor M (including rotation under inertia) with the sensor and circuit functioning normally, a fault occurs for example in any of the high frequency signal generator 54, the second amplifier AMP 2, the rectifying circuit REC 2 or the capacitor C3, the second output generating conditions of the second input terminal B of the window comparator 55 are not satisfied. Moreover, when a fault occurs in the sensor section, the first output generating conditions of the first input terminal A of the window comparator 55 are not satisfied. The window comparator 55 thus outputs an output signal the same as for when the motor 12 is rotating (that is a signal of logic value 0 indicating danger).

In this way, as well as there being no exciting output generated for the solenoid 31 when the motor 12 is being driven with the power switch 16 on, an exciting output is not generated when the motor 12 is rotating under inertia immediately after switching off the power switch 16. Only after the motor 12 has completely stopped, is the solenoid 31 excited so that the lock of the door switch 15 is released. Moreover, when there is a fault in the rotation stopped detection sensor, the sensor output becomes an output of logic value 0 corresponding to a low energy condition. Consequently, the safety of the operator can be reliably ensured.

The on-delay circuit of the fail-safe two input window comparator will now be described.

At first the construction of the two input window comparator will be described in detail.

The fail-safe window comparator circuit, its operation and fail-safe characteristics are disclosed in Trans. IEE of Japart Vol. 109-C, No. 9 September 1989 under the heading "A Structural Method for an Interlock System using a Fail-Safe Logic Element having Window Characteristics". Moreover this is also disclosed in literature such as the Proc. of 19th International Symp. on Multiple-Valued Logic, IEEE Computer Society (May 1989) under the heading of "Application of Window Comparator to Majority Operation", and the IEEE TRANSACTION on INSTRUMENTATION AND MEASUREMENT, Vol. 38, No. 2(April, 1989) under the heading of "Realization of Fail-Safe Train Wheel Sensor Using Electromagnetic Induction". Furthermore, a two input fail-safe window comparator implemented by an LSI is disclosed in IEICE TRANS. ELECTRON., Vol, E76-C, No. 3, March 1993 PP. 419–427 under the heading of "LSI Implementation and Safety Verification of Window Comparator Used in Fail-Safe Multiple-Valued Logic Operation". The fail-safe window comparator circuit has also been previously disclosed by one of the present inventors in U.S. Pat. No. 4,661,880, U.S. Pat. No. 5,027,114 and in Japartese Examined Patent Publication No. 1-23006.

A representative circuit example and details of its operation will now be given.

Figure 9:
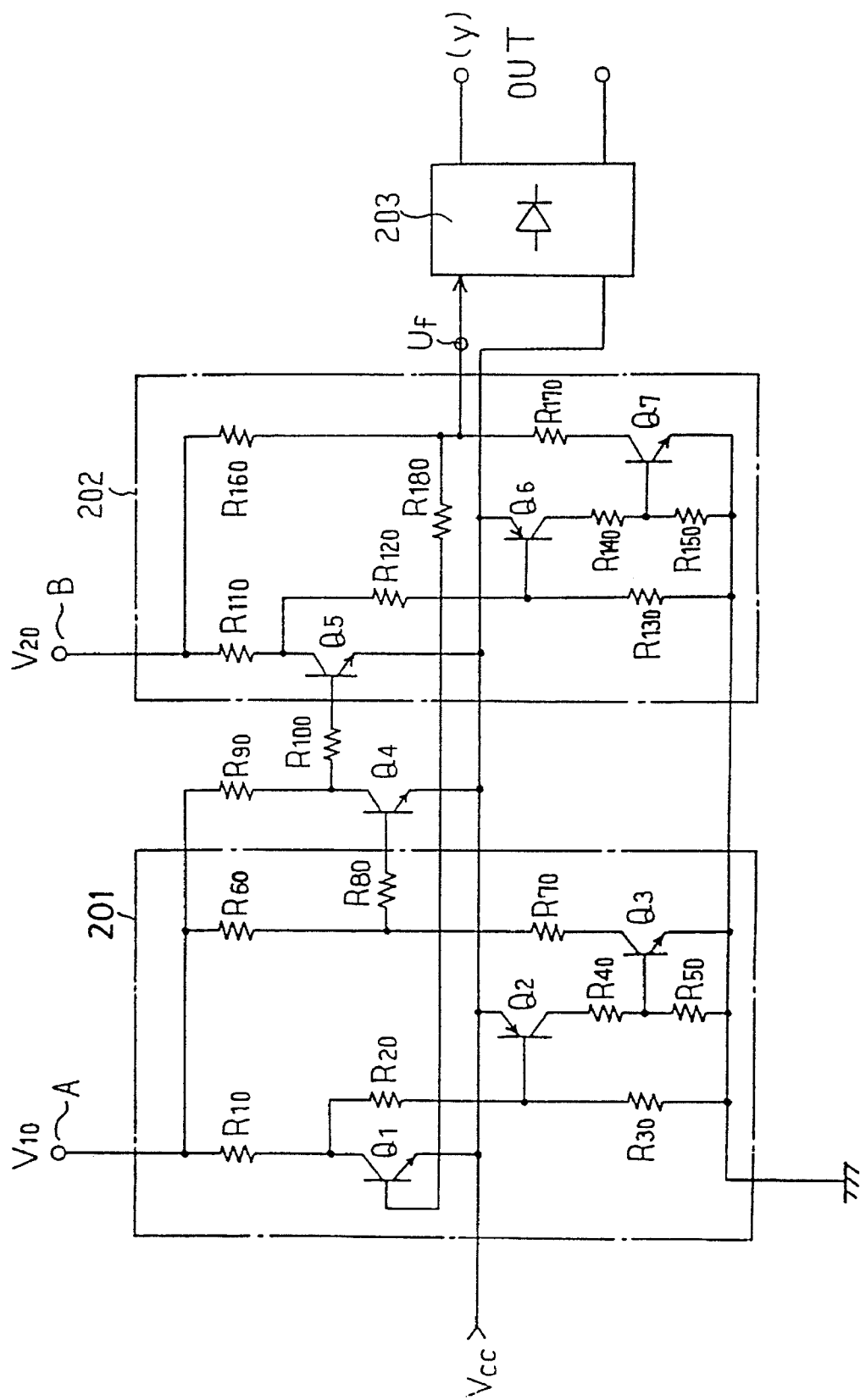
FIG. 9 is a circuit diagram of a fail-safe two input window comparator.

FIG. 9 is a circuit diagram of a fail-safe window comparator. Since the circuit of FIG. 9 has a fail-safe logical product function this is more precisely described a two input fail-safe window comparator/AND gate, to be precise.

In FIG. 9, symbols R10, R20 through R170, R180 indicate resistors, Q1 through Q7 indicate transistors, A, B indicate input terminals, Vcc indicates the power source potential for the window comparator, and numeral 203 indicates a rectifying circuit. The areas in FIG. 9 outlined by chain lines comprise direct-coupled direct current amplifying circuits 201, 202 which use respective transistors Q1, Q2, Q3, and Q5, Q6, Q7. Both have identical direct current amplifying circuit constructions. The circuits differ from a general direct current amplifying circuit in that the transistor Q1 and the transistor Q5 are outside of the power source potential Vcc (the emitters of the NPN transistors Q1 and Q5 are connected to the power source potential Vcc). Consequently, an input signal having a voltage higher than the power source potential Vcc must be supplied to the base of the transistors Q1 or Q5. The collectors of the transistors Q1 and Q5 are connected to the input terminals A, B through respective resistors R10 and R110. It will be apparent that as long as input signals higher than the power source potential Vcc (referred to as an input signal of potential outside the frame of the power source) are not supplied to the input terminals A, B, then the transistor Q1 and the transistor Q5 will not operate as amplifiers. Transistor Q4 constitutes a phase inversion circuit (inverter) and has a function of inverting and amplifying the output signal from the direct current amplifying circuit 201. Transistor Q4 also, as with transistors Q1 and Q5, operates with a base input potential and collector input potential (supplied from the input terminal A via resistor R90) higher than the power source potential Vcc. The base input signal to the transistor Q5 is supplied from the collector of the transistor Q4. Therefore if a signal of a higher input level than the power source voltage Vcc is applied to the input terminal A, then a signal of a potential higher than the power source potential Vcc is supplied to the base of the transistor Q5.

The emitters of both transistors Q3 and Q7 are at earth potential, while the collectors are connected to the input terminals A and B by way of respective resistors R60, R70, and R160, R170. Consequently, if an input signal of a potential higher than the power source potential Vcc is applied to the input terminals A and B, then the collector potentials of the transistor Q3 and the transistor Q7 become earth potential when the transistors respectively come ON, and become the potential of the input terminals when the transistors respectively go OFF, that is, attain a potential higher than the power source potential Vcc. Since the switch signal resulting from switching the transistor Q3 and the transistor Q7 on and off is respectively supplied to the base of the transistor Q4 by way of the resistor R80, and to the base of the transistor Q1 by way of the resistor R180, the transistor Q4 and the transistor Q1 can be respectively switched on and off using the output signal of the collector of the transistor Q3 and the output signal of the collector of the transistor Q7.

That is to say, the circuit of FIG. 9 constitutes a feedback oscillator, with the direct current amplifying circuit 201 direct-coupled to the direct current amplifying circuit 202 by way of the transistor Q4, and the output signal of the direct current amplifying circuit 202 direct-coupled to the direct current amplifying circuit 201 by way of the resistor R180.

Conditions for oscillation of the circuit of FIG. 9 are determined by the following equations, where V10 is the input potential of the input terminal A, and V20 is the input potential of the input terminal B;

For the input terminal A $$(r_{10}+r_{20}+r_{30})Vcc/r_{30} < V_{10} < (r_{60}+r_{70})Vcc/r_{70} \quad (1)$$

For the input terminal B, $$(r_{110}+r_{120}+r_{130})Vcc/r_{130} < V_{20} < (r_{160}+r_{170})Vcc/r_{170} \quad (2)$$

In the above two equations, $r_{10}$ through $r_{170}$ indicate the resistance values of the respective resistors. Moreover, symbol < means less than or approximately equal. In equation (1) $(r_{10}+r_{20}+r_{30})$ Vcc/$r_{30}$ represents the approximate lower limit threshold value of the input terminal A, while $(r_{60}+r_{70})$ Vcc/$r_{70}$ represents the approximate upper limit threshold value of the input terminal A. In a similar manner, $(r_{110}+r_{120}+r_{130})$ Vcc/$r_{130}$ in equation (2) represents the approximate lower limit threshold value of the input terminal B, while $(r_{160}+r_{170})$ Vcc/$r_{170}$ represents the approximate upper limit threshold value of the input terminal B. When the input terminal A has an input level $V_{10}$ within a range satisfying equation (1), and input terminal B has an input level $V_{20}$ within a range satisfying equation (2), the circuit of FIG. 9 oscillates and an alternating current output signal is produced at terminal Uf. This alternating current output signal is rectified in the rectifying circuit 203 to become a direct current output signal (if an alternating current output signal is not generated at the terminal Uf, then a direct current output signal is not produced). With regards to oscillation of the window comparator, equation (1) is for the beforementioned first output generating conditions, while equation (2) is for the beforementioned second output generating conditions.

The oscillation process in the circuit of FIG. 9 occurs when the voltage level of the input signals to the input terminals A and B both satisfy equations (1) and (2), and the transistors Q1 to Q7 are switched for example as described below.

At first with no input voltage supplied to either of the input terminals A or B, the state of the respective transistors is; transistor Q1:OFF, transistor Q2:ON, transistor Q3:ON, transistor Q4:OFF, transistor Q5:OFF, transistor Q6:ON, and transistor Q7:ON.

Then when an input voltage which satisfies equation (1) (a voltage within the threshold value range having upper and lower limits expressed by equation (1)) is supplied to the input terminal A, the state of the respective transistors becomes; transistor Q1:OFF, transistor Q2:OFF, transistor Q3:OFF, transistor Q4:ON, transistor Q5:OFF, transistor Q6:ON, and transistor Q7:ON. In this case, the output conditions of the transistors Q2, Q3, Q4, are switched by the input signal of the input terminal A. However since an input voltage lower than the lower threshold value limit expressed by equation (2) is supplied to the input terminal B, the output conditions of the transistors Q5, Q6, Q7 and Q1 do not change. Consequently, if a signal of a predetermined threshold value level is input to only one of the input terminals, the circuit of FIG. 9 does not oscillate.

Subsequently when an input voltage satisfying equation (2) (a voltage within the threshold value range having upper and lower limits expressed by equation (2)) is supplied to the input terminal B, while the input voltage satisfying equation (1) is being input to the input terminal A, the circuit oscillates with the respective transistors switching in the following manner: Q6:OFF→Q7:OFF→Q1:ON→ Q2:ON→Q3:ON→Q4:OFF→Q5:ON→Q6:ON→Q7:ON→ Q1:OFF→Q2:OFF→Q3:OFF→Q4:ON→Q5:OFF→ Q6:OFF→and so on.

Here the upper and lower threshold value interval (width) for the input terminals A and B expressed by equations (1) and (2) is called a window, and the comparator illustrated by FIG. 9 having such upper and lower threshold values for the input level is called a window comparator.

Since the circuit of FIG. 9 oscillates to generate an alternating current output signal only after direct current input voltages which respectively satisfy equations (1) and (2) are supplied to input terminals A and B, it has the function of an AND gate. Moreover, since either of the input terminals A or B has a function of a window comparator, the circuit is called a two input window comparator/AND gate. Setting the window in the window comparator, has the meaning in FIG. 9, of setting the upper and lower threshold values of the input terminals A or B, with respect to an input level.

The circuit of FIG. 9, has the characteristic that if any one of the transistors Qi (i=1~7) is faulty (for example if a short circuit fault occurs between the base and collector of the transistor), then the phase of the feedback loop is inverted so that a feedback oscillation cannot be produced. Moreover, insofar as a voltage at the respective input terminals A and B which is higher than the power source potential Vcc, is not supplied to the collector side of the transistors Q1, Q3, Q4 and transistors Q5, Q7, then switch signals cannot be output to the bases of the transistors succeeding these transistors (respective transistors Q2, Q4, Q5 and transistors Q6, Q1). The circuit of FIG. 9, thus has the characteristic that even with faults occurring in a plurality of the transistors (even a short circuit occurring between the base and collector of a plurality of the transistors) then as long as input signals (input signals satisfying equations (1) and (2)) higher than the power source voltage are not supplied to both input terminals A, B, it cannot oscillate. Moreover, in the case of a disconnection fault in the resistors which determine the oscillation threshold value (the resistances which determine equation (1) and equation (2)), the circuit of FIG. 9 has the characteristic that it cannot oscillate (similarly if a short circuit fault occurs it cannot oscillate). In other words, even in the worst case scenario where a short circuit or disconnection fault occurs in the transistors and resistors which make up the circuit, the circuit of FIG. 9 has the characteristic that; "there is no situation wherein oscillation erroneously occurs in spite that an input voltage determined by equations (1) and (2) is not supplied to both the input terminals A and B". Consequently, the circuit of FIG. 9 is referred to as a fail-safe window comparator/AND gate.

The rectifying circuit 203 of FIG. 9 has the function of rectifying the AC output signal produced by oscillation of the direct current amplifying circuit 202, to give a direct current output signal (y=1). The method of rectifying the oscillating output signal to give a direct current output signal also includes amplifying the output signal of the oscillation circuit of FIG. 9 before input to the rectifying circuit (for example as disclosed in the beforementioned literature of K. Futsuhara, N. Sugimoto, M. Mukaidono et al). Moreover, in FIG. 9, a phase inversion amplifying circuit comprising the transistor Q4 is inserted as an inverter between, but separate from, the two direct current amplifying circuits 201, 202. This phase inversion amplifying circuit however may be incorporated into one of the two direct current amplifying circuits (for example as disclosed in the beforementioned literature such as the IEICE TRANS. ELECTRON., Vol., E76-C, No. 3, March 1993).

The rectifying circuit 203 will now be described.

FIGS. 10(a) and (b) show structural examples of rectifying circuits for the circuit of FIG. 9.

In the figure, symbol Vcc indicates the power source potential, C11 indicates a coupling capacitor, C12 indicates a smoothing capacitor, D2 indicates a diode for clamping the alternating current input signal at the power source potential Vcc, and D1 indicates a diode for rectifying the alternating current input signal. When a plurality of operational circuits such as those of FIG. 9 are driven using the alternating current output signal for operations resulting from the oscillations of the circuit of FIG. 9, then in order to ensure a large fan out, the alternating current output signal for the oscillations is input to the rectifying circuit 203 via an amplifying circuit. In this case, the amplitude of the alternating current output signal is limited by the power source potential Vcc of the amplifying circuit. The alternating current input signal shown in FIG. 10(a) represents a signal having the amplitude limited in this way by the power source potential Vcc.

In FIG. 10(a) the alternating current input signal with amplitude limited by the power source potential Vcc passes via the coupling capacitor C11 and is superimposed by the power source potential Vcc as shown in the figure, by means of the clamping diode D2. The alternating current signal superimposed with the power source potential Vcc is rectified by the diode D1, and smoothed by the capacitor C12 to become a direct current output signal of potential v (region indicated by hatching in FIG. 10(a)). Accordingly, if the potential of the direct current output of the rectifying circuit of FIG. 10(a) is V, then this output potential is given by V=v+Vcc. If the rectifying circuit load is sufficiently small compared to the drive side output impedance of the rectifying circuit (amplifying circuit output impedance), then V=2 Vcc. Since this output potential is higher than the power source potential Vcc, then if the window comparator of FIG. 9 is connected after the rectifying circuit, an input voltage which can oscillate the window comparator can be obtained.

The rectifying circuit of FIG. 10(a) at least has the characteristic that there is no erroneous occurrence such as; a direct current output signal v is produced in spite of there being no input signal, due to a fault in one of the circuit elements, ie. C11, C12, or D1, D2. This characteristic does not change even if for example faults occur simultaneously in a plurality of the elements. Excepting that, when an input signal is supplied when there is a disconnection fault in the capacitor C12, the output signal v becomes an alternating current output signal (however, if an input signal is not supplied such an output signal does not occur). To ensure that even this alternating current output signal does not occur, then as shown in FIG. 10(b) a four terminal capacitor C12' can be used as a safety capacitor, instead of the smoothing capacitor C12 of FIG. 10(a).

Figure 10:
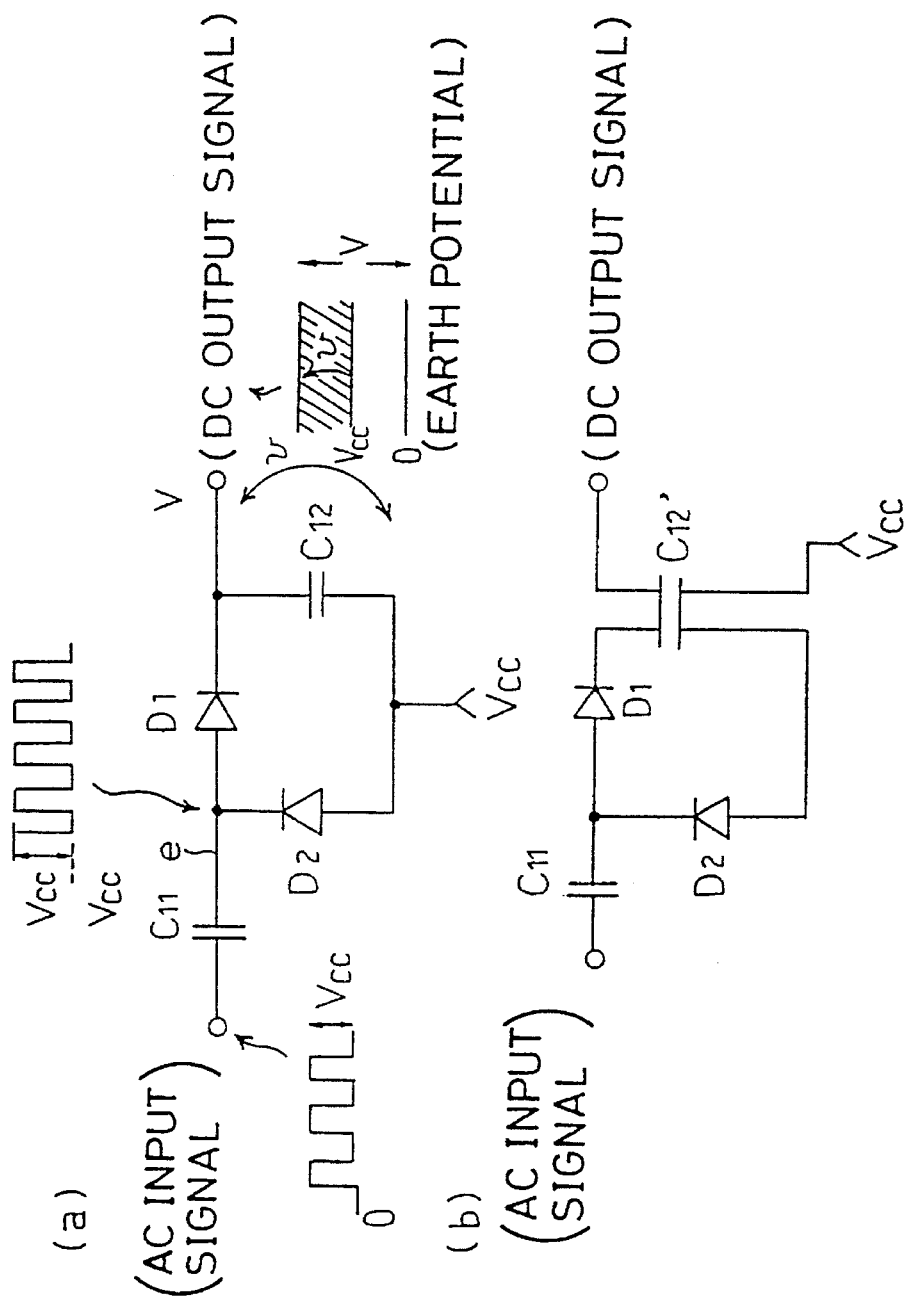
FIG. 10 is a circuit diagram of rectifying circuits applicable to the present invention.

The characteristics of the window comparator used in FIG. 7 will be apparent from the above. When the output signals of the amplifiers AMP 1 and AMP 2 of FIG. 7 have a large amplitude, these are limited by the power source potential Vcc. That is to say, the amplitudes of the output signals of the amplifiers AMP 1 and AMP 2 are always smaller than the width of the power source potential. For obtaining an input signal for the window comparator 5 which requires an input signal of a level higher than power source potential Vcc from an amplifier output signal having a level lower than the power source potential Vcc, the rectifying circuit of FIG. 10 is used for the rectifying circuits REC 1 and REC 2 of FIG. 7. A method for converting the signal of an amplitude level lower than the power source potential into a direct current output signal of a level higher than the power source potential Vcc, may use the known method involving step up using a transformer and then rectifying.

The fail-safe on-delay circuit will now be described.

With the fail-safe on-delay circuit 56, the arrangement is such that the initially set delay time is not shortened by a fault.

Figure 11:
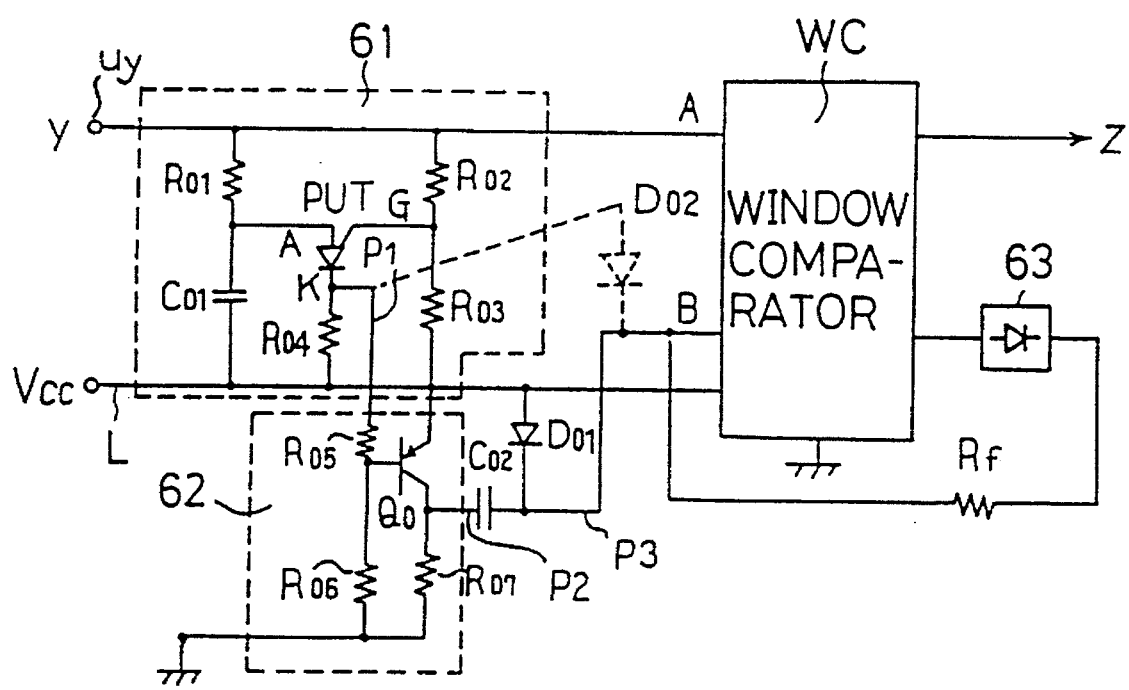
FIG. 11 is a circuit diagram illustrating a concrete example of a fail-safe on-delay circuit.

A circuit diagram for such a fail-safe on-delay circuit is shown in FIG. 11.

In FIG. 11, numeral 61 indicates a known PUT oscillation circuit, while numeral 62 indicates a level conversion circuit for converting the output signal from the PUT oscillation circuit 61 into a fluctuation lower than the power source potential Vcc and inverting the phase thereof. Symbols $R_{01}$, $R_{02}$, $R_{03}$, $R_{04}$, $R_{05}$, $R_{06}$ and $R_{07}$ indicate resistors, $C_{01}$, $C_{02}$ indicate capacitors, PUT indicates a programmable unijunction transistor, $Q_0$ indicates a transistor, 63 indicates a rectifying circuit different from the rectifying circuit 203 of FIG. 9, for rectifying the oscillating output signal from the terminal Uf in FIG. 9, while symbol Rf indicates a feedback resistor for feedback of the output signal of the rectifying circuit 63 to the input terminal B of a window comparator WC which has a construction similar to that illustrated in FIG. 9.

The operation of the on-delay circuit will now be described using the time chart of FIG. 12.

When the input signal y=1 (the signal indicated by V in FIG. 12) is supplied to the terminal Uy, this signal is input to the input terminal A of window comparator WC. As well as this, after a delay time τ determined by the time constant fixed by the resistance value of the resistor $R_{01}$ and the capacity of the capacitor $C_{01}$, and by the divided voltage ratio for the input voltage V to the resistors $R_{02}$ and $R_{03}$, the PUT conducts and an oscillating output is generated (the window of the input terminal A of the window comparator WC is set so that the input level V is greater than the lower limit threshold value ThAL). The oscillating output $P_1$ is phase inverted by the transistor $Q_0$ to become an output signal $P_2$, and the rising signal of the output signal $P_2$ is input to the other input terminal B of the window comparator WC by way of the capacitor $C_{02}$. When the rising signal of the output signal $P_2$ is input to the window comparator WC, the window comparator WC oscillates, and the oscillating output signal is rectified by the rectifying circuit 63 and fed back to the input terminal B by way of a feedback resistor Rf. As a result, even if the differential signal $P_3$ of the input signal $P_2$ is lost, the input signal y of the window comparator WC continues to produce oscillations until it becomes lower than the lower threshold value of the input terminal A (ie. the input signal $P_3$ is self held).

The fail-safe construction of the on-delay circuit of FIG. 11 will now be described.

In this respect, the resistors are susceptible to mechanical or heat failure, while the plates of the electrodes making up the capacitor are made from a non volathe material. There will therefore be a small change in the resistance value and the electrostatic capacity with temperature. However from the fail-safe point of view, it is sufficient to consider the resistors with respect to disconnection faults only, and to consider the capacitors with respect to lead disconnection faults and short circuit faults between the electrode plates. The PUT oscillation circuit 61 and the level conversion circuit 62 are such that there is no occurrence of self oscillation in spite of there being no input signal. Therefore, the PUT oscillation circuit 61 will only oscillate and generate an output pulse $P_1$ when the elements constituting the circuit are in a normal condition, and the input signal y reaches a level exceeding the lower threshold value of the input terminal A of the window comparator WC.

Moreover, even if for example a disconnection fault occurs in the resistors $R_{01}$, $R_{02}$, $R_{03}$, or the beforementioned disconnection or short circuit fault occurs in the capacitor $C_{01}$, or a disconnection fault occurs in the three electrodes A (anode), K(cathode), and G (gate) of the PUT, or a short circuit occurs between the electrodes, the output signal $P_1$ is not generated. However, since the resistor $R_{04}$ together with the capacitor $C_{01}$ determine the pulse width $\tau'$ of the output signal P1, in a case where a disconnection fault occurs in the resistor $R_{04}$, then the pulse width $t'$ of the signal P1 is increased. Hence, the delay period of the on-delay circuit ($\tau+\tau'$) becomes a little longer.

Figure 12:
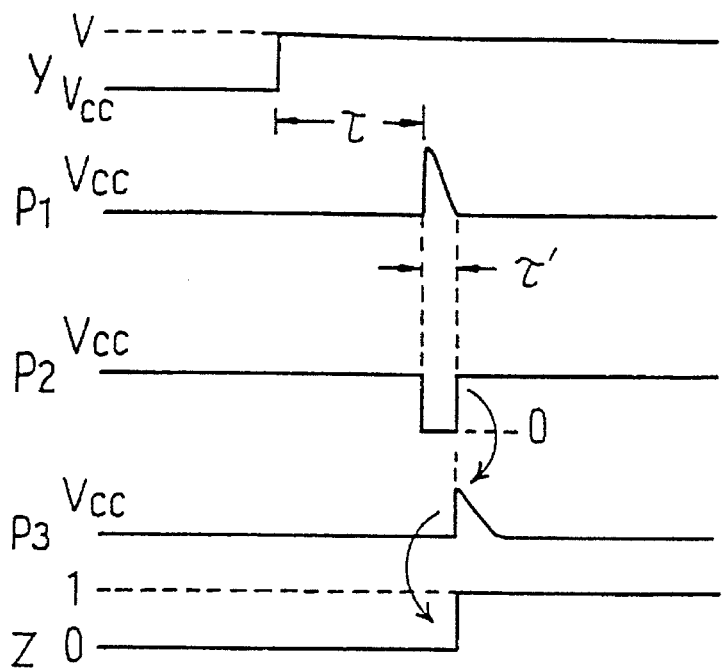
FIG. 12 a diagram for explaining an operation of the on-delay circuit of FIG. 11.

The purpose of the level conversion circuit 62 is to change the pulse signal $P_1$ generated with a pulse level higher than power source voltage Vcc, within the frame of the power source potential Vcc as shown by $P_2$ in FIG. 12. If the on-delay circuit is constructed with the oscillating output signal P1 of the PUT led directly to the input terminal B of the window comparator by way of the diode $D_{02}$ as indicated by the chain line of FIG. 11, then the level conversion circuit 62 can be omitted. However, if a disconnection fault occurs in the resistor $R_{03}$, and furthermore a short circuit fault occurs between the gate G and the cathode K, then when the input signal y is input, the signal y is input directly to both the input terminals A and B. As a result, during the time that the delay period $\tau$ is not being produced, the window comparator WC oscillates, resulting in a dangerous situation. To prevent this danger, the signal $P_1$ is once converted to the signal $P_2$ which is within the frame of the power source potential Vcc. This signal $P_2$ is then superimposed with the power source potential Vcc using the capacitor $C_{02}$ and the diode $D_{01}$ and input to the input terminal B.

The level conversion circuit 62 has one more important function. The rising signal of signal $P_2$ as shown by $P_3$ in FIG. 12 is input to the input terminal B. This rising signal $P_3$ signifies an output pulse which can be generated successively after the PUT oscillation circuit 61 oscillates and outputs the output signal P1. In other words, this rising signal $P_3$, provides proof that the PUT oscillation circuit 61 is operating normally. Even in a worst case scenario where a disconnection fault occurs in the resistor $R_{03}$ and the input signal y is supplied directly to the base of the transistor $Q_0$ by way of the resistor $R_{02}$, and between the gate G and the cathode K of the PUT, then since the rising signal of the input signal y becomes the falling signal in the output signal $P_2$ of the transistor $Q_0$, then it will not become the signal $P_3$ transmitted by the capacitor $C_{02}$ and the diode $D_{01}$.

In the circuit of FIG. 11 the input terminal A of the window comparator WC compensates for the weakness of the PUT oscillation circuit. In this regard, the delay operation of the PUT oscillation circuit 61 will be described with reference to the time chart shown in FIG. 13.

Figure 13:
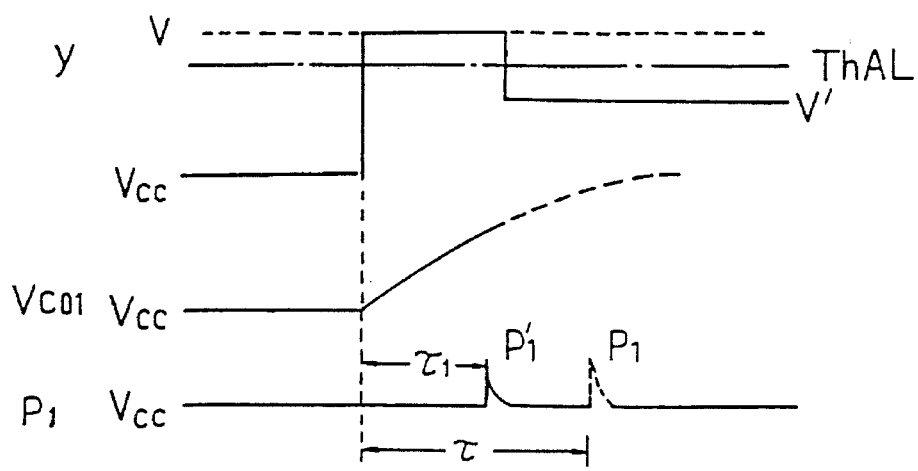
FIG. 13 is a diagram for explaining the fail-safe characteristics of the on-delay circuit of FIG. 11.

In FIG. 13, symbol $Vc_{01}$ indicates the change in the terminal voltage of the capacitor $C_{01}$ on the resistor $R_{01}$ side. The setting of the circuit is such that the input signal y rises to voltage V while charging the capacitor $C_{01}$ through the resistor $R_{01}$, and then after $\tau$ seconds, the output signal $P_1$ is generated. However if in a worst case situation, the input level V drops to V' before the $\tau$ seconds has elapsed, and the potential of the gate G of the PUT drops accordingly with the change in input level, then an output pulse $P_1'$ occurs at the point in time of $\tau1$, prior to the $\tau$ seconds. Here if the lower limit threshold value ThAL of the input terminal A of the window comparator WC is set so that the input level V' becomes lower than the lower limit threshold value ThAL of the input terminal A, then even in the worst case where there is a level change in the input signal y from V to V', and the pulse $P_1'$ is input to the input terminal B at the time of $\tau1$, prior to the predetermined time t, the window comparator WC will not oscillate.

Needless to say a UJT (uni-junction transistor, also referred to as a double base diode) can be used instead of a PUT.

Figure 14:
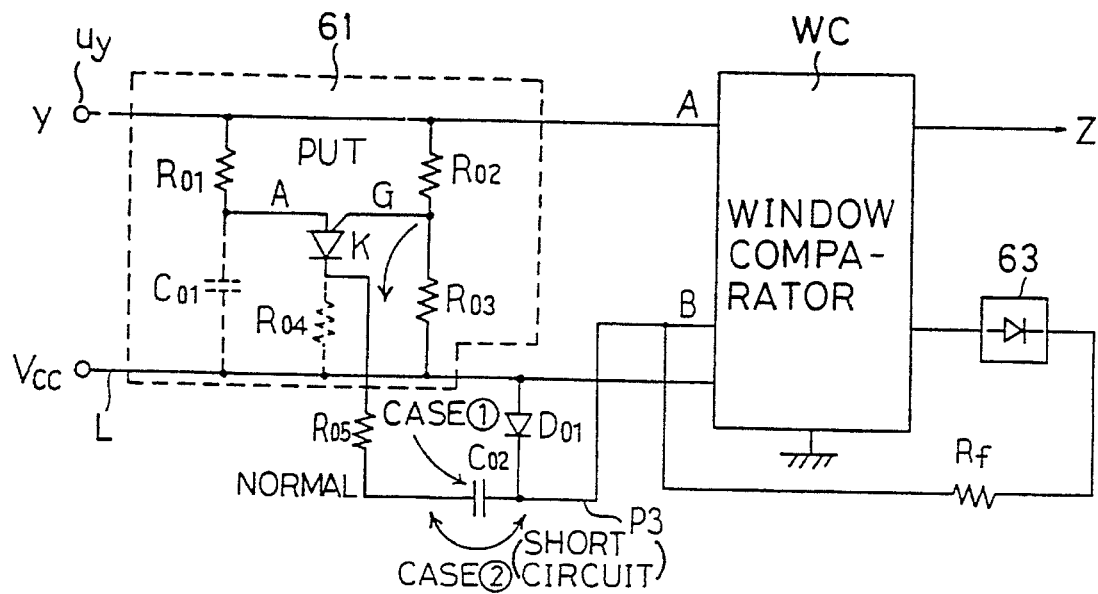
FIG. 14 is a diagram illustrating an example of a hypothetical failure mode for the on-delay circuit of FIG. 11.
Figure 15:
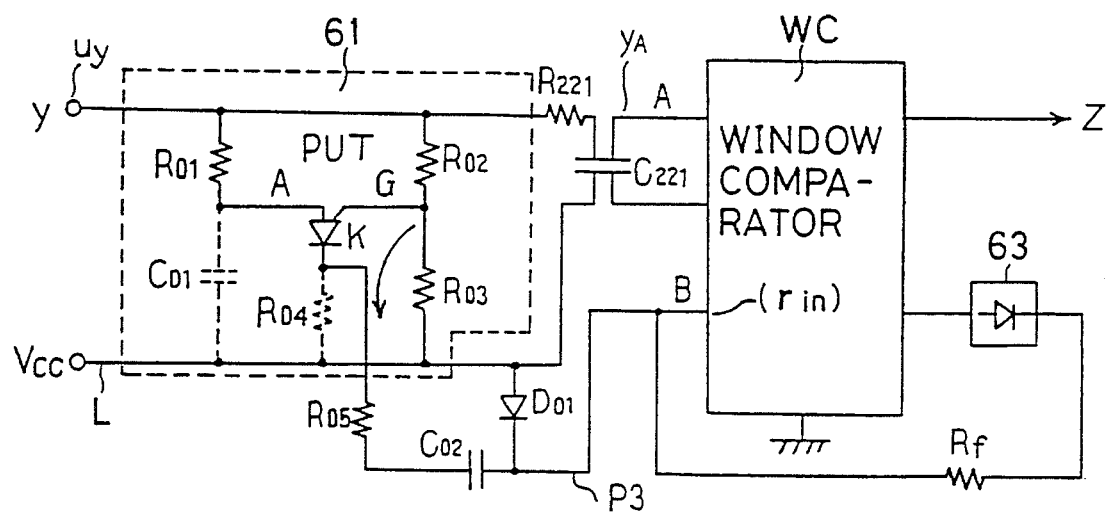
FIG. 15 is a structural diagram for dealing with the failure mode of FIG. 14.

When a disconnection fault occurs for example in the resistors $R_{04}$, $R_{06}$, $R_{07}$, and capacitor $C_{01}$, and a disconnection fault occurs in the collector of the transistor $Q_0$, then the circuit of FIG. 11 essentially becomes that of FIG. 14. In practice, such a multiple failure is not likely to occur at the same time. However in the case where, due to a fault in the components of the circuit, a signal higher than the power source potential Vcc is erroneously input to the input terminal B, then at this time the circuit becomes that of FIG. 14. To ensure that under these highly unfavorable conditions an incorrect output signal of z=1 is not produced, then as shown in FIG. 15 a delay circuit comprising a resistor $R_{221}$ and a four terminal capacitor $C_{221}$, is inserted in the on-delay circuit of FIG. 11 prior to the input terminal A. Moreover, the upper and lower limit threshold values ThBH and ThBL can be set in the input terminal B on the assumption of the fault.

With such a circuit, then in a worst case situation as illustrated by FIG. 14, the case indicated by (1) for where the capacitor $C_{02}$ is operating normally, can be distinguished from the case indicated by (2) for the short circuit fault in the capacitor $C_{02}$.

Figure 16:
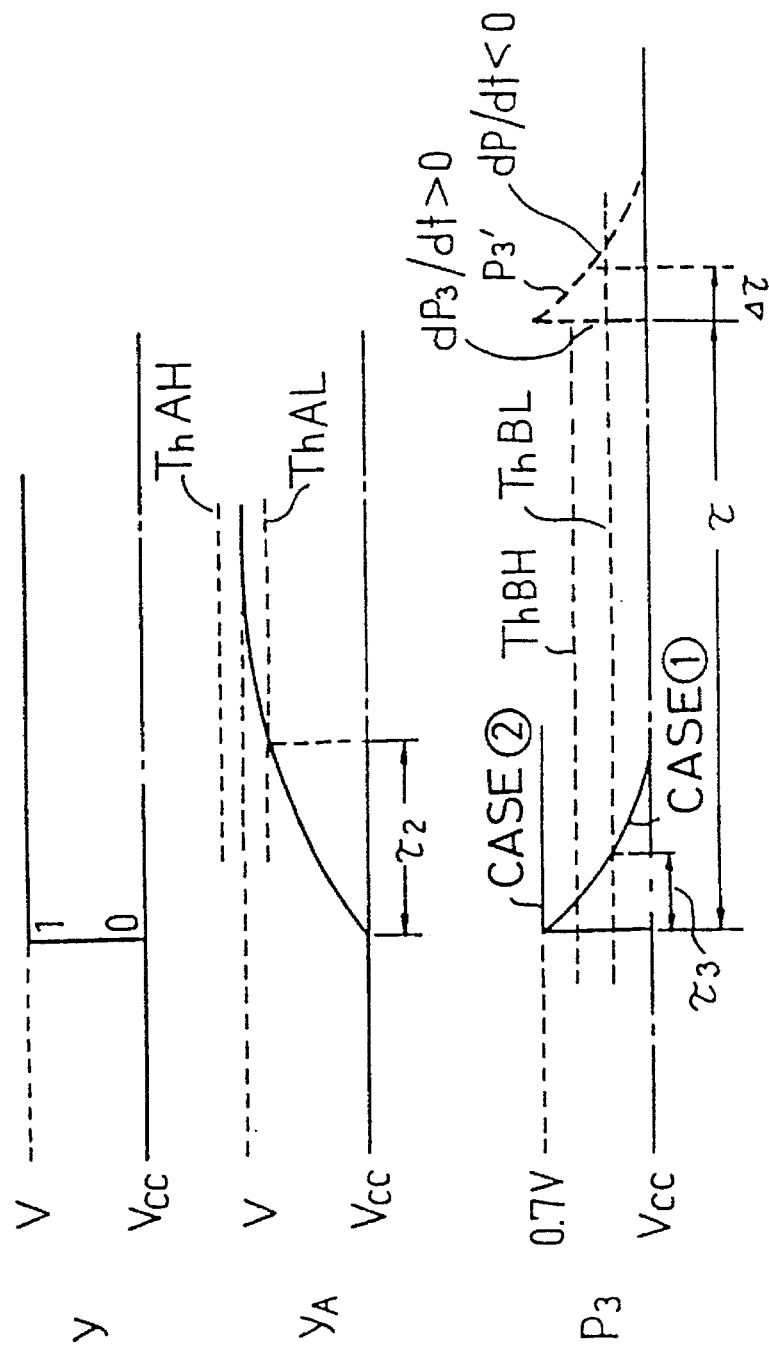
FIG. 16 is a diagram for explaining an operation of the circuit of FIG. 15.

Case (1) as shown by the waveform (1) of P3 in the time chart of FIG. 16, is for when the rising signal (differential signal) of the input signal y is input passing between the anode A and the cathode K, or between the gate G and the cathode K of the PUT. If this differential signal $P_3$ attains a level that satisfies the oscillation conditions at the input terminal B, then in the circuit of FIG. 14, when the input signal y is input to the window comparator WC, an output signal of z=1 is produced simultaneously (a delay time of $\tau$ does not occur). The resistor $R_{221}$ and the four terminal capacitor $C_{221}$ of FIG. 15 are inserted to avoid this.

In this respect, the signal $y_A$ for input to the input terminal A of the window comparator WC, as shown in FIG. 16 reaches the lower limit threshold value ThAL, $\tau2$ seconds after input of the input signal y=1 ($\tau2$ is a time constant determined by the resistor $R_{221}$ and the four terminal capacitor $C_{221}$). Here if the lower limit threshold value ThBL of the input terminal B of the window comparator WC is set so that the time $\tau3$ taken from the rise of the signal P3 until it becomes less than the lower limit threshold value ThBL set for the window comparator WC, becomes shorter than the above time constant $\tau2$, then even if the signal P3 is generated due to the rising of the input signal y=1, an output signal of z=1 does not occur.

The situation of case (2) wherein a short circuit fault occurs in the capacitor $C_{02}$ will now be described.

Here the input resistance of the input terminal B is made $r_{in}$, the resistance values of the resistors $R_{01}$, $R_{02}$, $R_{03}$, $R_{04}$, $R_{05}$ are made $r_{01}$, $r_{02}$, $r_{03}$, $r_{04}$, $r_{05}$ respectively, and under normal conditions $r_{01} \gg r_{in} \gg r_{02}$, $r_{03}$, $r_{04} \gg r_{05}$. In an extreme condition where a short circuit fault occurs between the anode A and cathode K of the PUT, then since $r_{01} \gg r_{in}$, the input voltage to the input terminal B drops, so that the lower limit threshold value ThBL can become higher than this input voltage. Subsequently, when as another different extreme condition, a short circuit fault occurs between the gate G and the cathode K of the PUT, the signal comprised of the input voltage V which is voltage divided by the resistors $R_{02}$ and $R_{03}$, is input to the input terminal B. Since generally, this voltage divided ratio (resistance value ratio $r_{02}/r_{03}$) is approximately 0.7, then this is shown as 0.7 V in the time chart of FIG. 16. Consequently, the upper limit threshold value ThBH of the input terminal B is preferably set to a value which is lower than this input voltage (for example 0.5 V). If a disconnection fault occurs in the resistor $R_{03}$ shown in FIG. 14, then an input voltage larger than the beforementioned 0.7 V is input to the input terminal B. Moreover, when a short circuit fault occurs simultaneously between the anode A and the cathode K, and the gate G and the cathode K of the PUT, then since $r_{01} \gg r_{02}$, there is practically no change with the short circuit conditions between the gate G and the cathode K. Furthermore, under conditions wherein there is no disconnection fault in the resistor $R_{04}$, then since $r_{04} \ll r_{02}$ and $r_{01}$, the input voltage of the input terminal B becomes a low level.

With the on-delay circuit (shown in FIG. 15) comprising the resistor R221 and the four terminal capacitor C221 attached to the on-delay circuit of FIG. 11, then under normal conditions with no faults, a signal (shown as $P_3'$ in FIG. 16) is produced at the input terminal B after $\tau$ seconds from input of signal y. Even if the height of this pulse P3' exceeds the threshold value ThBH of the input terminal B, this does not cause any problems. This is because if, prior to generation of the signal P3', the input signal $y_A$ of the input terminal A exceeds the lower limit threshold value ThAL, then the rise of the signal P3' generated after $\tau$ seconds (dP3'/dt>0) or the fall thereof (dP3'/dt<0) exists within the range of the window given by the threshold values ThBH and ThBL, so that window comparator WC oscillates, enabling the signal to be self held (with an error difference of $\Delta\tau$).

Thus if a delay circuit comprising the resistor $R_{221}$ and the four terminal capacitor $C_{221}$ is fitted in this way prior to the input terminal A of the circuit of FIG. 11, and upper and lower limit threshold values ThBH and ThBL for an error signal produced by a fault in the circuit and having a potential higher than the power source potential Vcc, are stipulated for the input terminal B of the window comparator WC, then the on-delay circuit becomes one which can better prevent erring to the danger side due to circuit faults (errors shortening the delay time).

A fail-safe amplifier will now be described.

The normal transistor amplification level may be increased or reduced due to a fault but is not likely to be increased more than 30%. The output signal is thus fixed to a certain level as far as the transistor amplifier will not self oscillate at the time of a fault. Because of this, with the fail-safe amplifier using an alternating current signal for the input signal, output of the alternating current signal as an output signal having a predetermined amplitude constitutes normal operation of the amplifier. In an extreme case, where a fault occurs in the amplifier, the output level is fixed at a certain value (level) and therefore, does not become an alternating current output signal. The condition on which this thinking is based is that the amplifier does not self oscillate. Consequently, a negative feedback amplifier is not really suitable as a fail-safe amplifier. A negative feedback amplifier however has the advantage that the amplification level is hardly changed with temperature. Moreover, the thinking is based on that the input signal level is small, and accordingly, even if due to a fault in the amplifier, the input signal is output directly to the output side without amplification since the output level is small, the output signal will not exceed the threshold value prepared for the output side.

Figure 17:
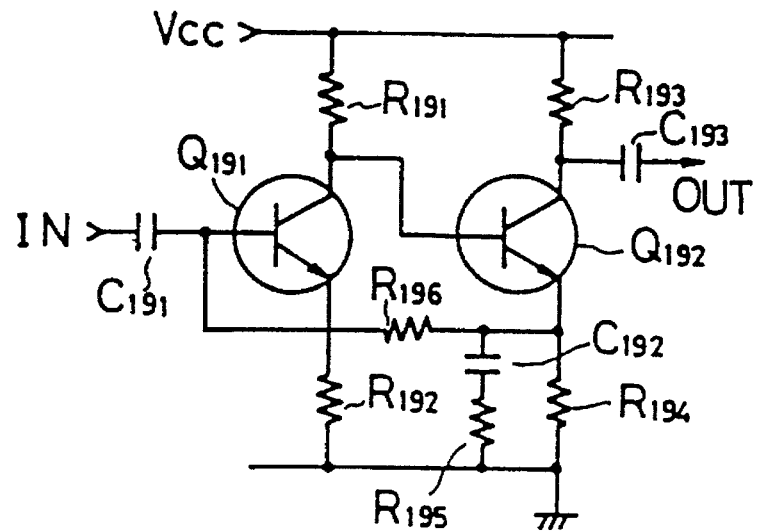
FIG. 17 is a circuit example of a fail-safe amplifier.

FIG. 17 shows an example of a fail-safe negative feedback amplifier (capable of amplifying to approximately 30 dB). [110][see A59307-[126]

In FIG. 17, symbols R191, R192, R193, R194, R195, R196 indicate resistors, C191, C192, C193 indicate capacitors, while Q191, Q192 indicate transistors. The output signal is feedback from the emitter side of the transistor Q192 through the resistor R196 to the base of the transistor Q191. The capacitor C193 corresponds for example to the capacitor C11 in FIG. 10. In the circuit of FIG. 17, if at first a disconnection fault occurs in the resistors R191, R192, R193, R194, R196, the output signal of the transistor Q192 becomes fixed at either a high or low output level. Similar output conditions also result when a short circuit fault occurs in the capacitor C192, since this will change the base bias of the transistor Q191 considerably. When a disconnection fault occurs in the capacitor C192 and a disconnection fault occurs in the resistor R195, the amplification level drops and the amplitude of the output from the transistor Q192 is reduced. However, when such a fault occurs and for fixing the output signal of the transistor Q192 at a constant level, then the construction can be that of FIG. 18.

Figure 18:
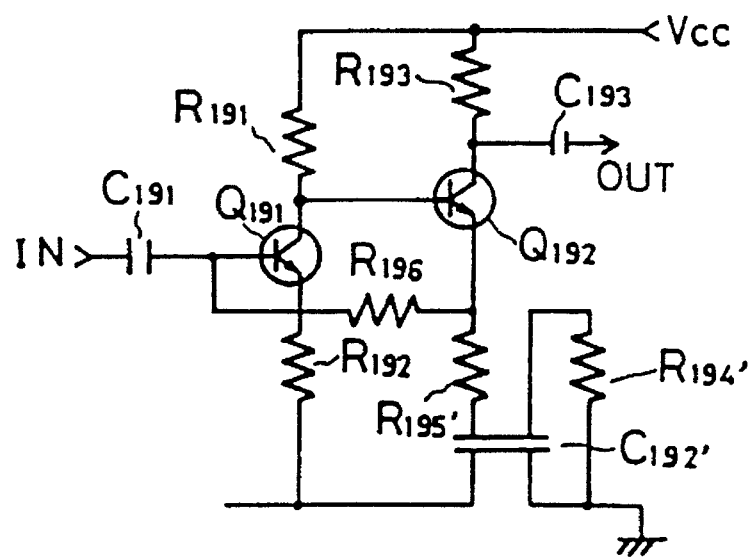
FIG. 18 is an another circuit example of a fail-safe amplifier.

In FIG. 18, with the exception of the resistors R194', R195', and the capacitor C192', the other elements are the same as those of FIG. 17.

In FIG. 17, the emitter resistance of the transistor Q192 with respect to the alternating current signal is the combined resistance of resistors R194 and R195 in parallel. The resistance of resistor R195' in FIG. 18 may be made approximately equal in size to this resistance. In FIG. 17, the emitter resistance of transistor Q192 with respect to a direct current signal is the resistance of resistor R194. In FIG. 18 the total resistance of resistors R195' and R194' may be made approximately equal to this size. In FIG. 18, a four terminal capacitor is used as the capacitor C192', so that even if a disconnection fault occurs in one of the resistors R194', R195', and even if a short circuit or disconnection fault occurs in the capacitor C192', the output signal of the transistor Q192 is fixed at the specific direct current level.

An embodiment for a case where the safety ensuring apparatus of the present invention is applied to a system using pressure as the power source for the mechanical moving part will now be described with reference to FIG. 19.

Figure 19:
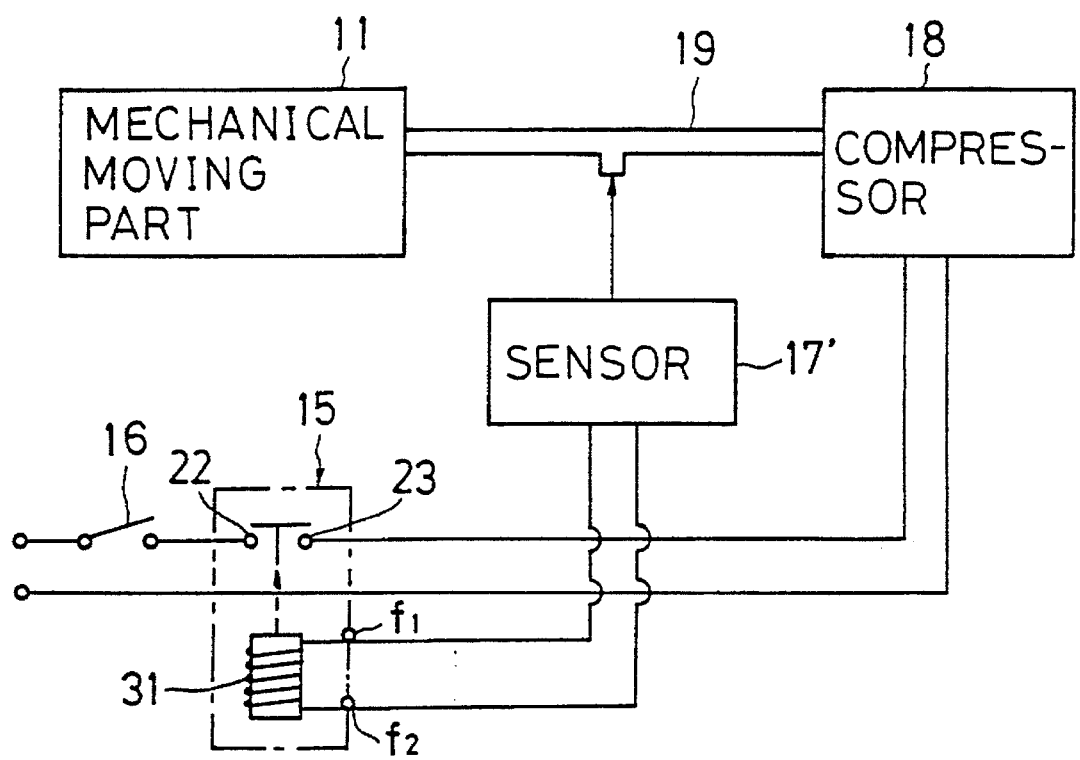
FIG. 19 is a circuit diagram showing an embodiment of the present invention wherein the safety ensuring apparatus is applied to a pressure driven mechanism.

In FIG. 19, a pressure, acting as a drive source, is supplied from a compressor 18 to a mechanical moving part 11 via a pressure supply path 19. A moving part monitoring sensor 17' is fitted to the pressure supply path 19 to detect the internal pressure and generate an output of logic value 1 corresponding to a high energy condition for exciting the solenoid 31 of the door switch 15, when the residual pressure is detected to have dropped to approximately zero.

The mechanical moving part 11, the compressor 18 and the moving part monitoring sensor 17' are covered by a safety enclosure 13 in a similar manner to the embodiment of FIG. 2. Moreover, as with the construction of FIG. 2, power is supplied through a power switch 16 to a motor of the compressor 18 via a door switch 15.

When the power switch 16 is switched off, cutting off the power source to the compressor 18, then after the residual pressure inside the pressure supply path 19 has dropped sufficiently, (or become zero), the moving part monitoring sensor 17', generates a high energy current for driving the solenoid. With this arrangement, the moving part monitoring sensor 17', as with the sensor 17 of FIG. 3, must have the characteristics such that when there is a fault in the moving part monitoring sensor 17', a solenoid drive current is not erroneously generated while a dangerous pressure condition remains inside the pressure supply path 19 (that is to say, it must have fail-safe characteristics). With such a sensor, when the residual pressure drops sufficiently, an output signal of a high energy condition is generated from the sensor, and this signal can be used either directly or for example, after amplification, as a current output for driving the solenoid.

Figure 20:
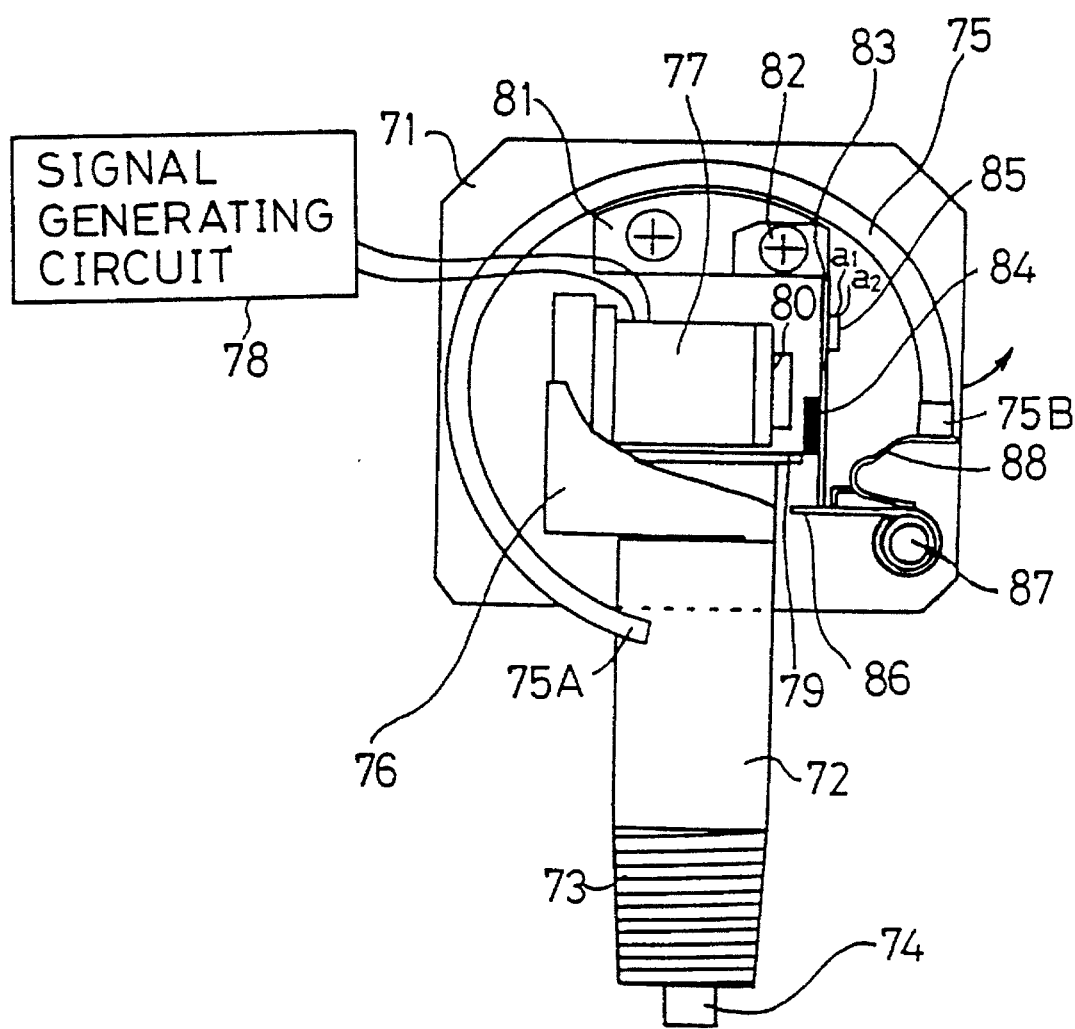
FIG. 20 is a schematic diagram of a residual pressure sensor suitable for use as a moving part monitoring sensor in the embodiment of FIG. 19.
Figure 21:
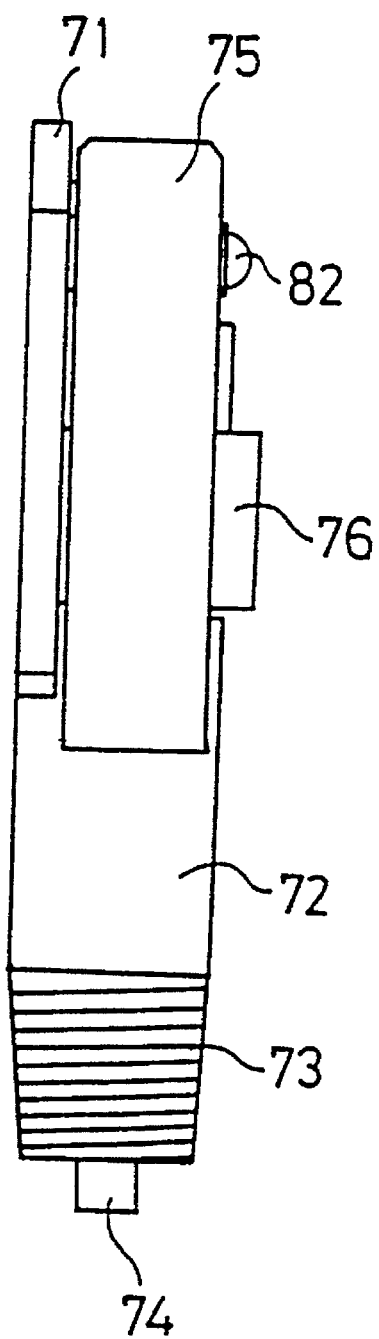
FIG. 21 is a left side view of the sensor of FIG. 20.

FIGS. 20 and 21 show a concrete example of a residual pressure sensor which generates an output of a high energy condition when a drop in pressure is detected.

In FIGS. 20 and 21, a pressure inlet pipe 72 is fixed to a lower portion of a base 71. The pressure inlet pipe 72 is fitted to the pressure supply path 19 which supplies pressure from the compressor 18 to the mechanical moving part 11, and introduces this pressure to the sensor One end is closed off while the other end is provided with a threaded portion 73 and a pressure inlet 74 for introducing pressure when the threaded portion 73 is connected to the pressure supply path 19. A pressure sensing pipe 75, bent into the form of an approximate C shape, is fixed to the pressure inlet pipe 72 by means of a fixing portion 75A at one end, so as to be communicatingly connected thereto, while the other end is made a closed-off end 75B. As a result, when a pressure is introduced by way of the pressure inlet pipe 72, the closed-off end 75B is displaced in the direction of the arrow in FIG. 20 with the rise in pressure.

An electro-magnet 77 is fitted at an approximately central portion of the base 71 by means of an electromagnet support 76. The electro-magnet 77 is supplied with an alternating current signal from a signal generator circuit 78 (signal generating device) and alternating current excited to produce an alternating magnetic field. Numeral 79 indicates a yoke for forming a field path for the generated alternating magnetic field in conjunction with an iron core 80 of the electro-magnet 77.

A flat cantilever spring 83 which is fixed at one end by means of a screw 82 to a metal fitting 81 which is securely attached to the base 71 above the electro-magnet 77, is located so that the other free end extends downward past the electro-magnet 77 to a location within the operating region of the alternating magnetic field generated by the electro-magnet 77. A permanent magnet 84 is fixed to the cantilever spring 83 near the free end on the side facing the electro-magnet 77, while a vibration transducer 85, (for example a tuning fork vibration transducer) is fixed to the cantilever spring 83 near the fixed end on the opposite side. In FIG. 20, symbols a1 and a2 indicate leads for taking out the electrical output signal from the vibration transducer 85.

A flat contact spring 86 is provided in the vicinity of the free end of the cantilever spring 83 so as to extend in a perpendicular direction thereto. The contact spring 86 is attached at one end to the base 71 by means of a spring adjustment shaft 87, and is located thereby so that an upper face of the other end is able to contact the end face of the free end of the cantilever spring 83. A displacement communicating strip 88 which has one end fixed to the closed-off end 75B of the pressure sensing pipe 75, is fixed at the other end to the upper face of the contact spring 86. The contact spring 86 is adjusted by means of the spring adjustment shaft 87 so that it is separated from the free end of the cantilever spring 83 under conditions wherein the pressure inside the pressure sensing pipe 75 is below a predetermined value. When a pressure higher than the predetermined value is introduced into the pressure sensing pipe 75, then due to the resultant displacement of the closed-off end 75B, the contact spring 86 is pulled in an upward direction (in FIG. 20) by means of the displacement communicating strip 88 so as to press against the free end tip face of the cantilever spring 83 to stoppingly engage the cantilever spring 83. Accordingly, the contact spring 86, the spring adjustment shaft 87 and the displacement communicating strip 88 constitute a device for stoppingly engaging the cantilever spring.

The operation will now be described.

At first the pressure inlet pipe 72 is fitted, by means of the threaded portion 73, to the pressure supply path 19 so that the pressure inlet 74 faces into the pressure supply path 19. Then in this condition, at first an alternating current signal is supplied from the signal generator circuit 78 to the electro-magnet 77 so that the electro-magnet 77 is continuously excited by the alternating current. When the electro-magnet 77 is excited by the alternating current, then a force due to the alternating field produced thereby, acts alternately so as to pull and repel the permanent magnet 84 provided between the iron core 80 and the yoke 79.

When the pressure supplied to the mechanical moving part 11 has practically disappeared, so that the pressure introduced to the pressure inlet pipe 72 is zero or below a predetermined value, then the closed-off end 75B of the pressure sensing pipe 75 is not displaced, so that at this time, due to adjustment by the spring adjustment shaft 87, the contact spring 86 does not contact the free end tip face of the cantilever spring 83. As a result, the free end of the cantilever spring 83 is free to move, and oscillates by the excitation frequency of the signal generator circuit 78 about the fixed end. The oscillations are convened to an electrical signal by the vibration transducer 85 and the resultant output signal is output therefrom by way of the leads a1, a2.

When there is a pressure supply to the mechanical moving part 11, so that the mechanical moving part 11 is in a drive condition, then a pressure is introduced to the pressure inlet pipe 72 via the pressure inlet 74. With the introduction of this pressure to the pressure sensing pipe 75, the closed-off end 75B of the pressure sensing pipe 75 is displaced depending on the introduced pressure, in the direction of the arrow in FIG. 20. Due to displacement of the closed-off end 75B, the tip end of the contact spring 86, is pulled in an upwards direction (in FIG. 20) by means of the displacement communicating strip 88. When the pressure inside the pressure sensing pipe 75 is higher than a predetermined value, the tip end of the contact spring 86, is pressed against the free end tip face of the oscillating cantilever spring 83. As a result, the movement of the cantilever spring 83 is restrained so that the cantilever spring 83 stops oscillating, thus terminating the electrical output signal from the vibration transducer 85.

That is to say, with this residual pressure sensor, when a pressure is not introduced by means of the pressure inlet 74, then an electrical output signal of a high energy condition is generated from the vibration transducer 85, while when a pressure is introduced by means of the pressure inlet 74, the oscillation of the cantilever spring 83 is stopped so that an electrical output signal is not generated from the vibration transducer 85.

Accordingly, if for example the electrical output signal of the leads a1, a2 is alternating current amplified and the amplified output signal is a direct current output using an envelope detector, so as to excite the solenoid 31 of the door switch 15, then the solenoid 31 is excited when there is no pressure so that the lock of the door switch 15 is released, while when pressure is supplied, the solenoid 31 becomes non-excited, so that the lock of the door switch 15 is not released.

Figure 22:
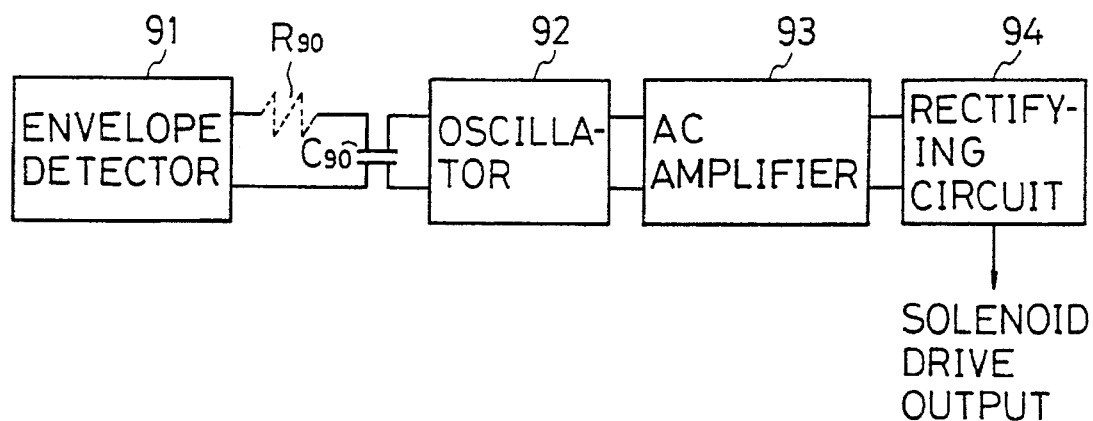
FIG. 22 is a circuit diagram of an embodiment of a fail-safe solenoid driver.

Moreover, with the sensors of FIG. 6 and FIG. 20 for example, the construction may involve a solenoid driver interposed between the envelope detector and the solenoid, with the solenoid driver being started by the output from the envelope detector to thus drive the solenoid. A fail-safe solenoid driver circuit example applicable to this case is shown in FIG. 22.

in FIG. 22, numeral 91 indicates an envelope detector which is included in a sensor for detecting the stopping of the mechanical moving part and generating an output having a high energy condition, numeral 92 indicates an oscillator, numeral 93 indicates an AC amplifier, numeral 94 indicates a rectifying circuit, and symbol C90 indicates a four terminal capacitor.

With the solenoid driver, when an output of a high energy condition is produced by the envelope detector 91, the four terminal capacitor C90 becomes a smoothing capacitor for the envelope detector 91, the oscillator 92 oscillates, and the output signal from the oscillator 92 is amplified by the AC amplifier 93, rectified by the rectifying circuit 94 and supplied to the solenoid 31. Consequently, an output signal for driving the solenoid is generated immediately in response to the output signal of the envelope detector 91 to thus excite the solenoid.

For the fail-safe solenoid driver, power for driving the oscillator 92 is supplied from the four terminal capacitor C90. Hence, the oscillator 92 does not produce an erroneous oscillation when there is no output from the envelope detector 91. Moreover, when the output signal of the AC amplifier 93 is rectified, a transformer coupling is generally used for the coupling of the AC amplifier and the rectifier. An example of such a circuit construction is disclosed for example in Japartese Examined Patent Publication No. 44-15249, and U.S. Pat. No. 3,171,062.

If a resistor R90 is inserted in the circuit of FIG. 22, between the envelope detector 91 and the four terminal capacitor C90 as indicated by the broken line in the figure, this will cause a delay period from after generation of an output signal of a high energy condition from the envelope detector 91, until generation of the output signal from the rectifying circuit 94 for exciting the solenoid, determined by the inserted resistor R90 and the four terminal capacitor C90. An on-delay circuit construction thus becomes possible.

With the safety ensuring apparatus of the present invention as described above, the sensor which detects the stopping of the mechanical moving part and generates an exciting signal for the solenoid, is constructed so as to directly generate an output signal of logic value 1 corresponding to a high energy condition when the mechanical moving part is in a stopped condition, and to generate an output signal of logic value 0 corresponding to a low energy condition when the mechanical moving part is in a drive condition. That is to say, the sensor is constructed so as to directly generate an output signal for solenoid drive without a negative operation. Therefore, when for example there is a fault in the sensor, the output is of the danger output form (output of logic value zero) the same as for a drive condition of the mechanical moving part. Consequently, even if the mechanical moving part is in a drive condition, there is no danger of erroneous generation of a solenoid drive output signal to release the lock of the door switch 15. It is thus possible to reliably ensure the safety of the operator.

Figure 23:
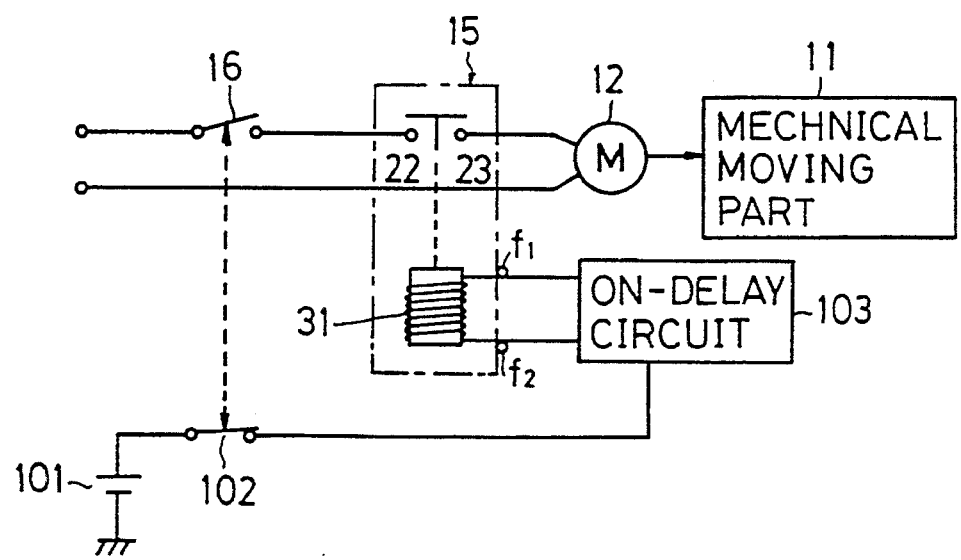
FIG. 23 is a circuit diagram showing an embodiment of the safety ensuring apparatus of the present invention constructed with an on-delay circuit instead of the moving part monitoring sensor.

A safety ensuring apparatus according to the present invention which does not use a moving part monitoring sensor is shown in FIG. 23.

With this safety ensuring apparatus, the beforementioned fail-safe on-delay circuit is used instead of the moving part monitoring sensor.

With the construction of FIG. 23 the mechanical moving part 11 is driven by a motor 12 in a similar manner to the arrangement of FIG. 3. A power source 101 is the drive power source for a fail-safe on-delay circuit 103 such as shown in FIG. 11 and FIG. 15, and supplies power to the on-delay circuit 103 via a switch 102 which is linked to the power switch 16. The output from the on-delay circuit 103 is connected to terminals f1, f2 of the solenoid 31 of the door switch 15.

The switch 102 corresponds to a detection section for detecting if the power switch 16 is off, and is constructed so as to switch on when the power switch 16 is switched off, and to switch off when the power switch 16 is switched on.

The operation will now be described.

When the power switch 16 is on, and the mechanical moving part 11 is being driven, the switch 102 is off, so that the on-delay circuit 103 does not operate and the solenoid 31 is non-excited. The door switch 15 is thus in the locked condition. When the power switch 16 is switched off in this condition, the switch 102 comes on so that operating power is supplied to the on-delay circuit 103. Consequently, after a pre-set delay time of the on-delay circuit 103 from switching off the power switch 16, a solenoid drive current is output from the on-delay circuit 103 so that the lock of the door switch 15 is released.

With such a construction, the lock of the door switch 15 is not released unless a certain time has elapsed after switching off the power switch 16. Therefore if the delay time of the on-delay circuit 103 is made sufficiently longer than the time interval from switching off the power switch 16 until the mechanical moving part 11 has stopped, then there is no possibility of the lock of the door switch 15 being released before the mechanical moving part 11 has stopped. Operator safety can thus be reliably ensured.

Since the on-delay circuit 103 has a fail-safe construction wherein as mentioned before, the output becomes a logic value of zero at the time of the fault, then as long as the power switch 16 is not switched off, there will be no generation of an exciting output signal for the solenoid 31.

INDUSTRIAL APPLICABILITY

The present invention is able to reliably ensure the safety of operators in an operating space requiring a high degree of safety for coordinated operations between an operator and a mechanical moving part. It therefore has wide industrial applicability.

We claim:

1. A safety ensuring apparatus wherein a mechanical moving part is surrounded by a safety enclosure, and a door lock means is provided in a door of the safety enclosure, said door lock means being constructed such that a lock is released when a current is supplied to excite a solenoid incorporated therein, the apparatus being constructed such that said door lock means releases a door lock when the mechanical moving part is stopped, characterized in that the construction incorporates:

a moving part monitoring sensor which monitors if the mechanical moving part is stopped, detects a stopped condition and generates a signal of logic value 1 corresponding to a high energy condition as a signal indicating a safe condition without carrying out a NOT operation, and the solenoid of said door lock means is excited by the output of logic value 1 from said moving part monitoring sensor, wherein said moving part monitoring sensor is a rotation stopped detection sensor which detects stopping of rotation of a motor, which constitutes a drive source for the mechanical moving part, as a non-conductive condition of the motor being logic value 1 corresponding to a high energy condition.

2. A safety ensuring apparatus according to claim 1, further comprising a motor power supply circuit for providing said supply current to said motor via a power switch, and wherein said rotation stopped detection sensor comprises:

a first transformer with a secondary winding formed from a portion of a current line which is provided in parallel with the motor and closer to the motor than the power switch, transmitting means connected to a primary winding of said first transformer, for transmitting an alternating current signal to said current line by way of said first transformer, a second transformer with a primary winding formed from a portion of another current line than said current line in the closed circuit including the motor which is created via said current line when said power switch is switched off, and receiving means connected to said secondary winding of said second transformer, for receiving by way of said second transformer, the alternating current signal transmitted from said transmitting means, and generating an output signal of logic value 1 indicating that the motor has stopped when the received signal level is higher jthan a predetermined level, wherein the core of at least one of said first transformer and said second transformer comprises a saturable magnetic body core.

3. A safety ensuring apparatus according to claim 1, wherein an output from the moving part monitoring sensor is delayed by a predetermined period by means of an on-delay circuit.

4. A safety ensuring apparatus according to claim 1, wherein said door lock means comprises a door switch disposed in a drive source supply line to the mechanical moving part, and incorporating electrical contacts which close a circuit to allow the current to flow in said supply line to said mechanical moving part if the door is closed, and to prohibit said current flow if the door is opened.

5. A safety ensuring apparatus according to claim 1, wherein said rotation stopped detection sensor detects rotation or stopping of the motor based on the presence or absence of supply current to the motor.

6. A safety ensuring apparatus wherein a mechanical moving part is surrounded by a safety enclosure, and a door lock means is provided in a door of the safety enclosure, said door lock means being constructed such that a lock is released when a current is supplied to excite a solenoid incorporated therein, the apparatus being constructed such that said door lock means releases a door lock when the mechanical moving part is stopped, characterized in that the construction incorporates:

a moving part monitoring sensor which monitors if the mechanical moving part is stopped, detects a stopped condition and generates a signal of logic value 1 corresponding to a high energy condition as a signal indicating a safe condition without carrying out a NOT operation, and the solenoid of said door lock means is excited by the output of logic value 1 from said moving part monitoring sensor, wherein said moving part monitoring sensor is a rotation stopped detection sensor which detects stopping of rotation of a motor, which constitutes a drive source for the mechanical moving part, based on impedance fluctuations in the motor excitor winding.

7. A safety ensuring apparatus according to claim 6, wherein said rotation stopped detection sensor comprises, a sensor section which generates an imbalance output of a bridge circuit as an output signal for detecting stopping or rotation of the motor, and which generates an output signal of a pre-set level for a motor stopped condition, and a signal judgment section for generating an output of logic value 1 for a motor rotation stopped condition based on the detection output signal from said sensor section, said sensor section incorporating a third transformer with a secondary winding connected in series with a snubber circuit which is connected in parallel with a motor excitor winding, a bridge circuit constructed with the primary winding of said third transformer disposed on one side, and resistors disposed on the other three sides, and an alternating current signal generator for supplying an alternating current signal to said bridge circuit.

8. A safety ensuring apparatus according to claim 7, wherein said signal judgment section incorporates, high frequency signal generation means for generating a high frequency signal for superimposing on an input signal from the sensor section, amplifying means, for amplifying said input signal superimposed with the high frequency signal and saturating the amplified input signal at the level of the input signal for when the motor is rotating, a capacitor interposed between said high frequency signal generation means and said amplifying means, for transmitting said input signal superimposed with the high frequency signal to said amplifying means, rectifying means for rectifying the output of said amplifying means, and a two input window comparator having a first input terminal for direct input of said input signal superimposed with the high frequency signal, and a second input terminal for input of the rectified output from said rectifying means, which generates a motor stopped judgement output of logic value 1, only when the levels of both signals input to the first input terminal and to the second input terminal are simultaneously within predetermined threshold value ranges determined by an upper limit value and a lower limit value pre-set for each input terminal, wherein the respective threshold value ranges of the first and second input terminals are set so that the level of the signal for input to the first input terminal becomes outside the threshold value range when the sensor section is faulty, and the level of the signal for input to the second input terminal becomes outside the threshold value range when the motor is rotating.

9. A safety ensuring apparatus wherein a mechanical moving part is surrounded by a safety enclosure, and a door lock means is provided in a door of the safety enclosure, said door lock means being constructed such that a lock is released when a current is supplied to excite a solenoid incorporated therein, the apparatus being constructed such that said door lock means releases a door lock when the mechanical moving part is stopped, characterized in that the construction incorporates:

a moving part monitoring sensor which monitors if the mechanical moving part is stopped, detects a stopped condition and generates a signal of logic value 1 corresponding to a high energy condition as a signal indicating a safe condition without carrying out a NOT operation, and the solenoid of said door lock means is excited by the output of logic value 1 from said moving part monitoring sensor, wherein said moving part monitoring sensor is a residual pressure detection sensor which detects the residual pressure of a pressure source which constitutes a drive source for the mechanical moving part.

10. A safety ensuring apparatus according to claim 9, wherein said residual pressure detection sensor comprises; an electro-magnet which is fixed to a base, signal generating means for generating an alternating current signal for alternating current exciting the electro-magnet to produce an alternating field, a cantilever spring with one end fixed to said base and another free end located within an operating region of the alternating magnetic field generated by said electro-magnet, a permanent magnet fixed to said free end of the cantilever spring, a vibration transducer fixed to the cantilever spring for converting the vibration of said cantilever spring into electrical signals, a pressure inlet pipe fixed to said base for introducing pressure to the sensor, a pressure sensing pipe with one end fixed to said pressure inlet pipe so as to be communicatingly connected thereto, and another end closed-off, so that the closed-off end is displaced with a rise in internal pressure, means for stoppingly engaging said cantilever spring, which is linked to the closed-off end of said pressure sensing pipe, and which engages with the free end of said cantilever spring due to displacement of the closed-off end when a pressure inside the pressure sensing pipe is higher than a predetermined value, and which releases engagement when the pressure is less than a predetermined value.

11. A safety ensuring apparatus wherein a mechanical moving part is surrounded by a safety enclosure, and a door lock means is provided in a door of the safety enclosure, said door lock means being constructed such that a lock is released when a current is supplied from outside to excite a solenoid incorporated therein, the apparatus being constructed such that door lock means releases a door lock when the mechanical moving part is stopped, characterized in that the construction incorporates a detector portion for detecting that the power supply switch for on/off switching of the drive source power to the mechanical moving part has been switched off, and an on-delay circuit for generating an output signal of logical value 1 corresponding to a high energy condition after a predetermined time delay from the time when the detector portion detects that the power supply switch is off and an input signal is input, and also for generating an output signal of logic value 0 corresponding to a low energy condition at the time of a fault, and the solenoid of the door lock means is excited by the output signal of logic value 1 from the on-delay circuit;

wherein said on-delay circuit comprises; a PUT oscillation circuit for conducting a PUT (programmable unijunction transistor) and generating an oscillating pulse with a predetermined delay time from applying a signal to an input terminal, a level conversion circuit for level converting the signal level of an oscillating pulse from said PUT oscillation circuit, a two input window comparator wherein a signal input by way of the signal input terminal of said PUT oscillation circuit, is applied to one input terminal, and a rising differential signal of the output from said level conversion circuit is applied to the other input terminal, and which generates an output of logic value of 1 when a signal of a level higher than the power source potential is input to said both input terminals and a self holding circuit which feeds back a rectified output of the two input window comparator to said second input terminal side to thereby self hold the output of the window comparator.

12. A safety ensuring apparatus according to claim 11, wherein a resistor and a four terminal capacitor are provided prior to one input terminal of the two input window comparator to which a signal input by way of the signal input terminal of said PUT oscillation circuit is applied, one end of the resistor being connected in series to the signal input terminal of the PUT oscillation circuit, said four terminal capacitor having two terminals of one electrode connected in series between said one end of the resistor and said one input terminal of the window comparator, and two terminals of the other electrode connected in series to the power supply line for the window comparator, and predetermined threshold value ranges which define an upper limit value and a lower limit value for the input signal levels are set for the second input terminal of the two input window comparator.

* * * * *